(12) United States Patent
Kuchiki

(10) Patent No.: US 9,432,575 B2
(45) Date of Patent: Aug. 30, 2016

(54) IMAGE PROCESSING APPARATUS

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 14/286,848

(22) Filed: May 23, 2014

(65) Prior Publication Data

US 2015/0002684 A1 Jan. 1, 2015

(30) Foreign Application Priority Data

Jun. 28, 2013 (JP) ................................. 2013-136922
Jun. 28, 2013 (JP) ................................. 2013-136923

(51) Int. Cl.
*H04N 5/232* (2006.01)
*H04N 5/262* (2006.01)

(52) U.S. Cl.
CPC ...... *H04N 5/23232* (2013.01); *H04N 5/23261* (2013.01); *H04N 5/23267* (2013.01); *H04N 5/2621* (2013.01); *H04N 5/23258* (2013.01)

(58) Field of Classification Search
CPC ........... H04N 5/23232; H04N 5/2621; H04N 5/23267; H04N 5/23261; H04N 5/23258
See application file for complete search history.

(56) References Cited

U.S. PATENT DOCUMENTS

| 8,531,539 | B2 * | 9/2013 | Sasaki | H04N 5/232 348/208.13 |
|---|---|---|---|---|
| 2006/0007327 | A1 * | 1/2006 | Nakamura | H04N 5/2621 348/239 |
| 2007/0086675 | A1 * | 4/2007 | Chinen | H04N 5/2625 382/284 |
| 2009/0021600 | A1 * | 1/2009 | Watanabe | H04N 5/23212 348/222.1 |
| 2010/0188535 | A1 * | 7/2010 | Mitsuya | H04N 5/217 348/241 |
| 2010/0208944 | A1 * | 8/2010 | Fukunishi | H04N 5/23248 382/107 |
| 2010/0265353 | A1 * | 10/2010 | Koyama | H04N 5/23232 348/222.1 |
| 2015/0002724 | A1 * | 1/2015 | Chuang | H04N 5/23293 348/346 |
| 2015/0043786 | A1 * | 2/2015 | Ohki | H04N 5/23254 382/107 |

FOREIGN PATENT DOCUMENTS

| JP | 2010-166304 A | 7/2010 |
|---|---|---|
| JP | 2012-094984 A | 5/2012 |

\* cited by examiner

*Primary Examiner* — Jason Flohre
(74) *Attorney, Agent, or Firm* — Canon USA, Inc. I.P. Division

(57) ABSTRACT

An image processing apparatus includes an identification unit configured to identify a main subject region and a background region different from the main subject region with respect to a plurality of images captured by an image capturing unit, a composition unit configured to align the main subject regions of the plurality of images and to generate a composite image in which predetermined blur processing is applied to the background region, a detection unit configured to detect an amount of movement of the background region between the plurality of images based on an image of the background region or information about shaking of the image capturing unit with respect to the plurality of images, and a control unit configured to control an amount of blurring in the blur processing based on the amount of movement of the background region between the plurality of images detected by the detection unit.

18 Claims, 21 Drawing Sheets

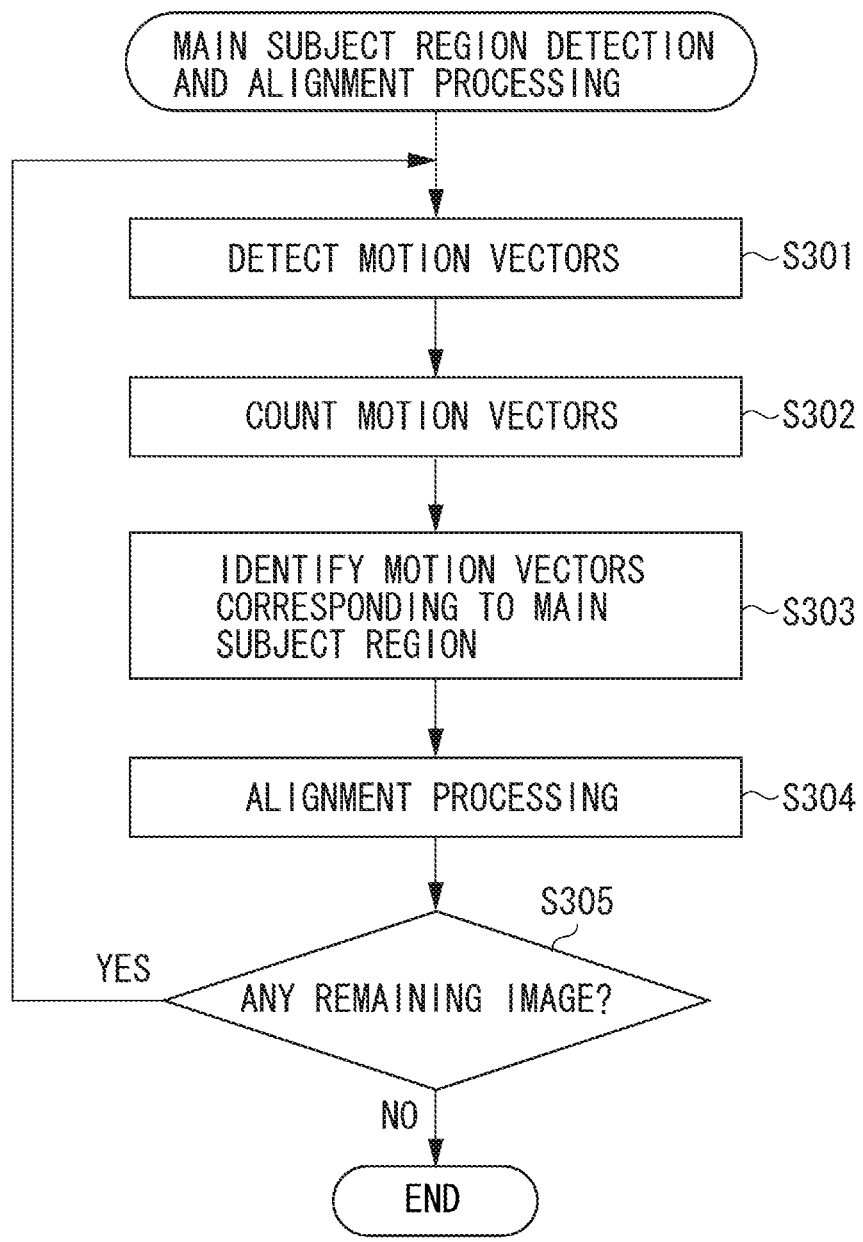

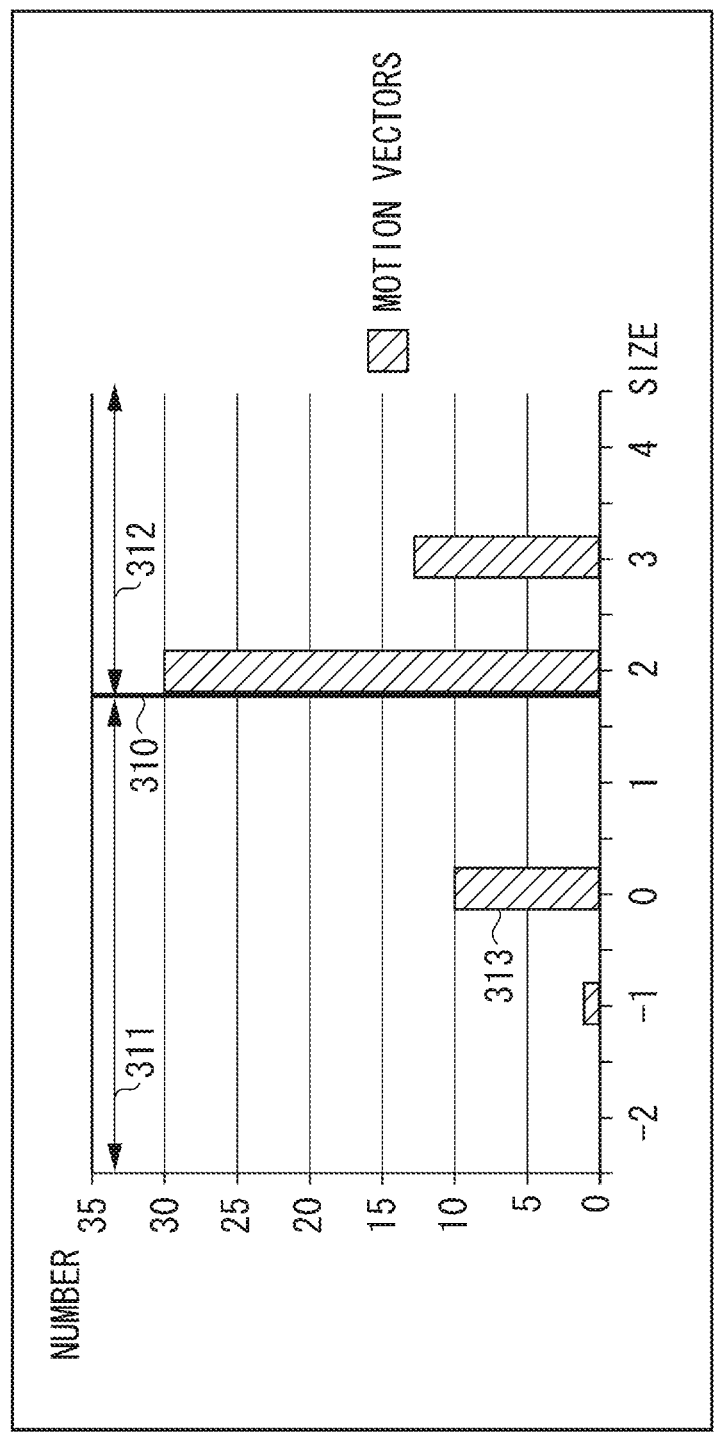

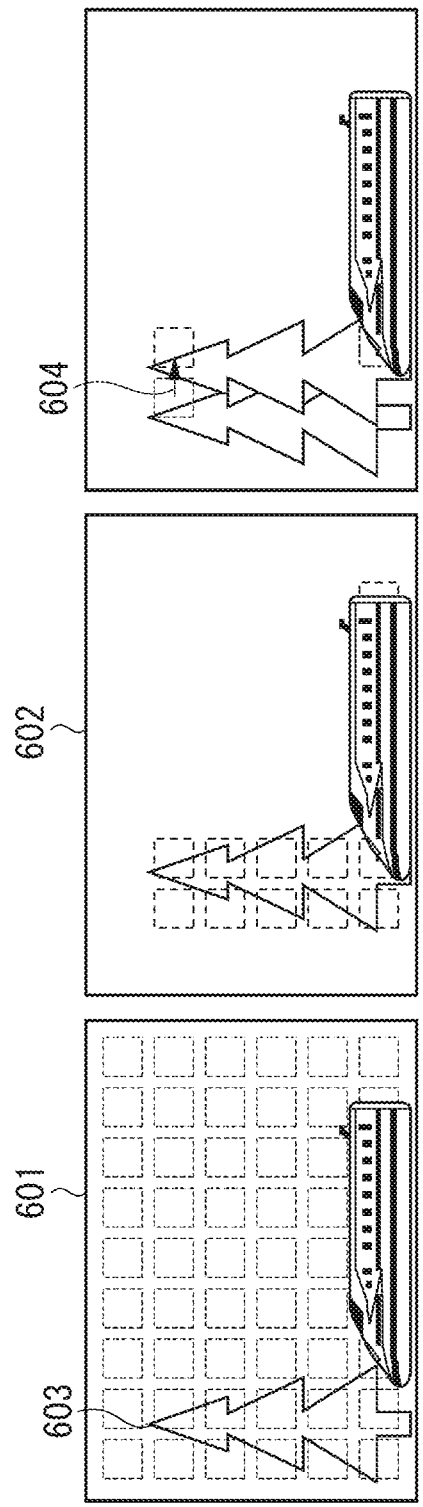

FIG. 10A
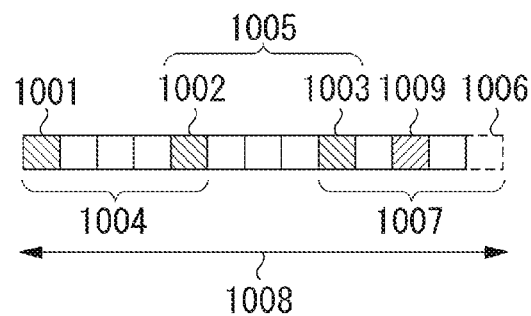
FIG. 10B
FIG. 10C
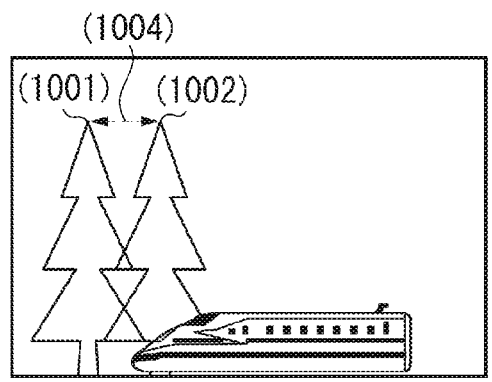
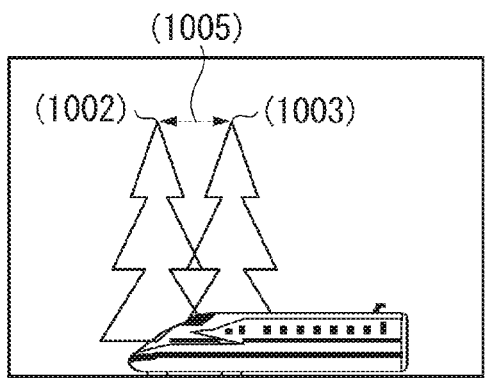
FIG. 10D
FIG. 10E
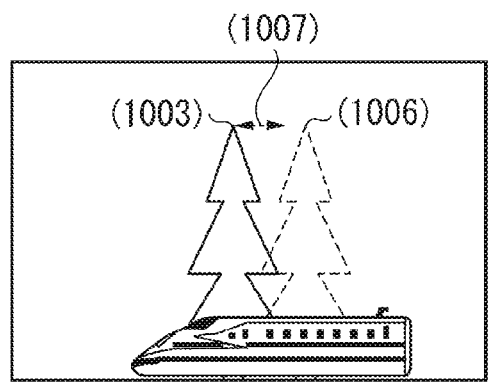
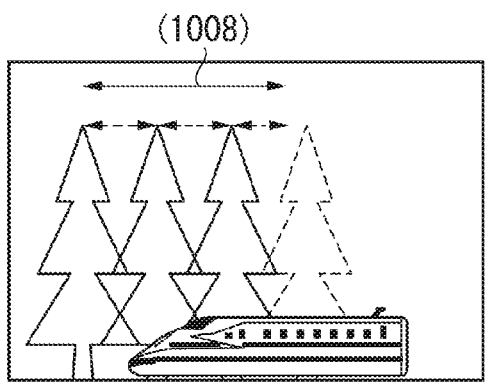

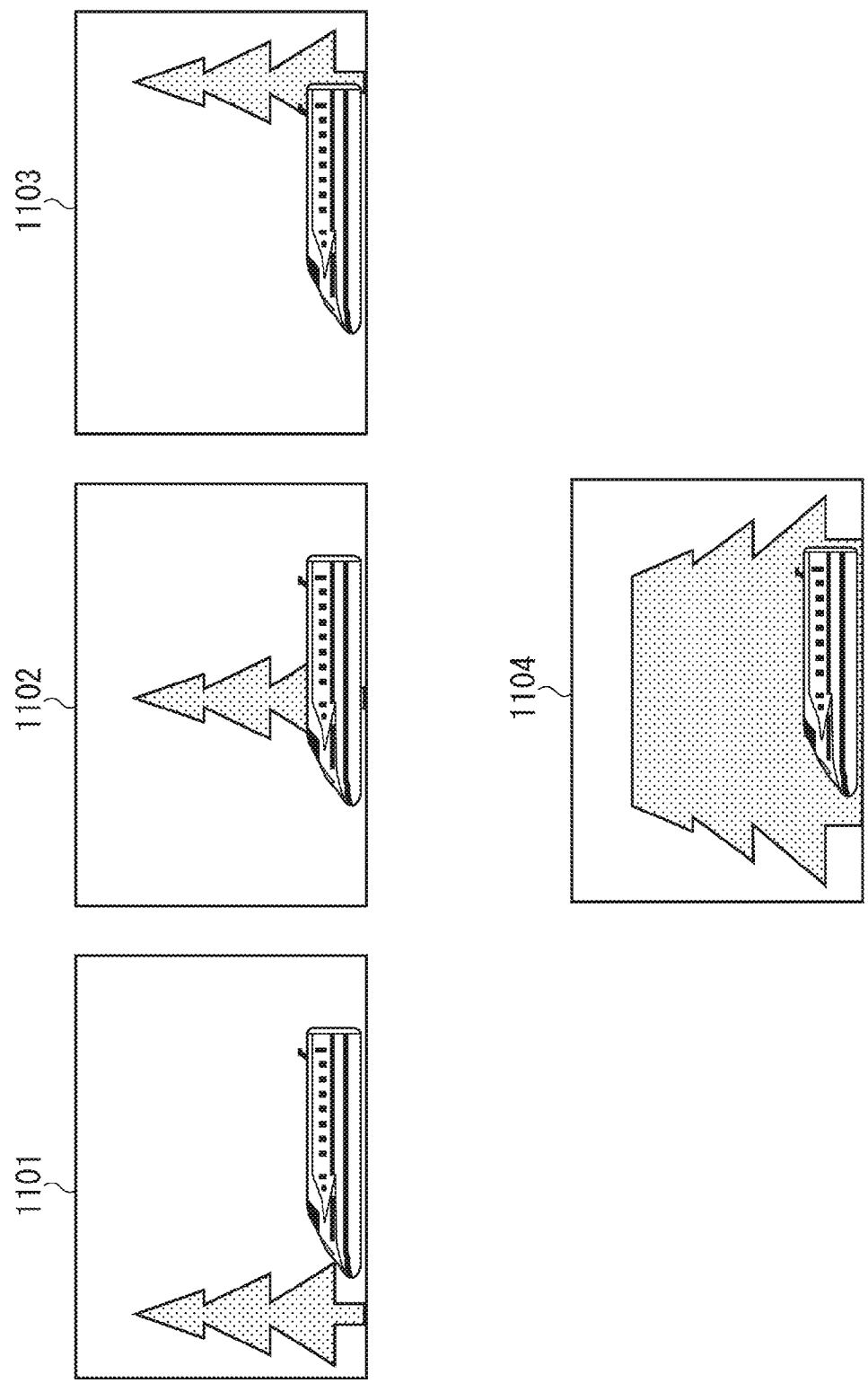

IMAGE PROCESSING APPARATUS

BACKGROUND OF THE INVENTION

1. Field of the Invention

The present invention relates to an image processing apparatus and, more particularly, to the adjustment of a streaming amount in panning shooting using image composition.

2. Description of the Related Art

Panning is one of shooting techniques for expressing a sense of speed of a moving subject. Such a technique is directed to performing shooting such that panning a camera according to the movement of a moving subject results in a still picture in which the moving subject appears stationary and the background appears streaming. General panning shooting is performed while adjusting the shutter speed to a relatively slower value according to the moving speed of a subject to be shot (a main subject). However, since the shutter speed is set slower, even a main subject is likely to become a blurred image due to a camera shake or a difference between the moving speed of the main object and the speed of panning. In view of the above issues, it is desirable to simplify panning shooting by using an image processing technique.

For example, Japanese Patent Application Laid-Open No. 2012-094984 discusses an image capturing apparatus (an image pickup apparatus, an imaging apparatus) that captures a relatively low-sensitivity image and a relatively high-sensitivity image and combines a partial image corresponding to a main subject region in the relatively high-sensitivity image with the relatively low-sensitivity image. Japanese Patent Application Laid-Open No. 2010-166304 discusses an image capturing apparatus that sets a main subject region within an imaging region, performs a plurality of exposures in the set main subject region during a period in which one exposure is performed in a region different from the set main subject region, i.e., a background region, and combines images obtained at the respective exposures.

However, in the image capturing apparatus discussed in Japanese Patent Application Laid-Open No. 2012-094984, since the stream of the background is expressed with a single image, if the main subject is not accurately tracked, even when the main subject region in the relatively high-sensitivity image is combined with the relatively low-sensitivity image, a main subject in the low-sensitivity image may remain around the main subject region in the relatively high-sensitivity image. Also, since the main subject and the background are shot at respective different points of time, the shape of the main subject may change between two images, so that main subject regions in the two images may not accurately overlap each other.

Also, in the image capturing apparatus discussed in Japanese Patent Application Laid-Open No. 2010-166304, a main subject region is previously set and the stream of the background is expressed with a single image. Therefore, when the main subject goes out of the main subject region during shooting or when the background comes into the main subject region during shooting, the boundary between the main subject and the background may appear unnatural.

SUMMARY OF THE INVENTION

The present invention is directed to an image processing apparatus and an image processing method which are capable of generating a panning-like image in which the boundary between a main subject and a background may appear smooth. The present invention is further directed to an image processing apparatus and an image processing method which are capable of performing alignment of images while focusing on a reduction of blurring due to shaking of a certain portion of a main subject.

According to an aspect of the present invention, an image processing apparatus includes an identification unit configured to identify a main subject region and a background region different from the main subject region with respect to a plurality of images captured by an image capturing unit, a composition unit configured to align the main subject regions of the plurality of images and to generate a composite image in which predetermined blur processing is applied to the background region, a detection unit configured to detect an amount of movement of the background region between the plurality of images based on an image of the background region or information about shaking of the image capturing unit with respect to the plurality of images, and a control unit configured to control an amount of blurring in the blur processing based on the amount of movement of the background region between the plurality of images detected by the detection unit.

Further features of the present invention will become apparent from the following description of exemplary embodiments with reference to the attached drawings.

BRIEF DESCRIPTION OF THE DRAWINGS

FIGS. 3A, 3B, and 3C are respectively a flowchart illustrating main subject region detection processing and alignment processing between images in the main subject region, a graph representing a histogram of motion vectors, and a flowchart illustrating panning composition processing.

FIG. 6 illustrates an example of processing for calculating motion vectors according to the first and second exemplary embodiments.

FIGS. 10A, 10B, 10C, 10D, and 10E are explanatory diagrams illustrating processing for calculating the number of taps of the LPF according to the second exemplary embodiment.

FIG. 11 is an explanatory diagram illustrating processing for generating a panning composite image according to an exemplary embodiment of the present invention.

DESCRIPTION OF THE EMBODIMENTS

To implement panning shooting by an image processing technique, an image in which a main subject is not blurred due to shaking is required. In a case where shooting is performed at such a shutter speed as not to blur a main subject due to shaking, since the width of shaking of the background is also likely to become small, it is necessary to impart the effect of panning shooting to the background. In view of the above issues, exemplary embodiments of the present invention are characterized by combining an image in which a main subject is not blurred due to shaking with an image in which a background is blurred, thus bringing about the same effect as in panning shooting.

Figure 1:
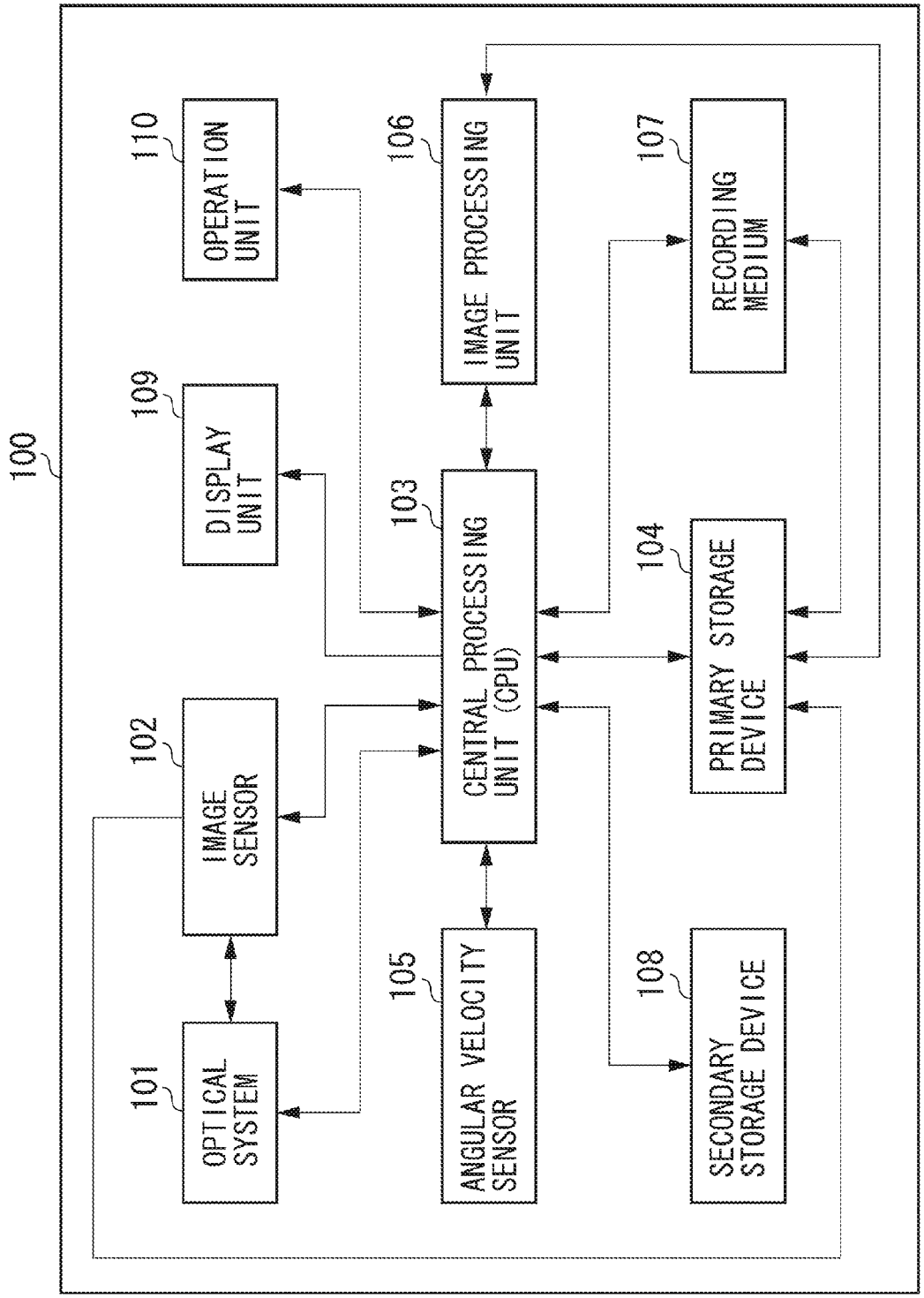
FIG. 1 is a block diagram illustrating a basic configuration of an image capturing apparatus according to first and second exemplary embodiments of the present invention.

FIG. 1 is a block diagram illustrating a configuration of an image capturing apparatus, which serves as an example of an image processing apparatus according to a first exemplary embodiment of the present invention.

An image capturing apparatus 100 may be a camera, such as a digital camera and a digital video camera, as well as an arbitrary electronic apparatus equipped with an image capturing function, such as a camera-function-equipped mobile phone, a camera-equipped computer, and a scanner. Also, a part or the whole of the image capturing apparatus 100 in the present exemplary embodiment may be treated as an image processing apparatus according to the present exemplary embodiment. The image processing apparatus is not necessarily required to have an image capturing function, but may only need to have a function that can process an image output from an image sensor 102 or an image stored in a storage device.

An optical system 101, which is composed of a lens, a shutter, and a diaphragm, guides a light bundle from a subject to the image sensor 102 to form an optical image of the subject on the image sensor 102. Then, the optical system 101 transmits information about the focal length, the shutter speed, and an aperture value to a central processing unit (CPU) 103.

The image sensor 102, which is composed of a charge-coupled device (CCD) sensor or a complementary metal-oxide semiconductor (CMOS) sensor, converts the optical image formed by the optical system 101 into an electrical signal. Then, the CPU 103 converts the electrical signal into a digital signal via an A/D converter and stores the digital signal in a primary storage device 104. In the present exemplary embodiment, the pixel arrangement of the image sensor 102 is the Bayer array of RGB pixels. However, this arrangement is not a restrictive one. For example, the arrangement of pixels of complementary color filters can be employed, and, in addition to pixels for image capturing, functional pixels can be arranged for the purpose of color metering or distance measurement. The electrical gain (hereinafter referred to as the ISO sensitivity) of the image sensor 102 is set by the CPU 103.

An angular velocity sensor 105, such as a gyro sensor, detects shaking of the image capturing apparatus 100, converts the shaking into an electrical signal, and transmits the electrical signal to the CPU 103.

The CPU 103, which serves as a control unit, controls various units included in the image capturing apparatus 100 according to an input signal or a previously stored program, thus implementing the functions of the image capturing apparatus 100. In the following description, at least a part of the functions implemented by the CPU 103 executing the program may be implemented by a dedicated hardware unit, such as an application specific integrated circuit (ASIC).

The primary storage device 104, which is a volatile storage device, such as a random access memory (RAM), is used as a work area for the CPU 103. Information stored in the primary storage device 104 can be used by an image processing unit 106 or can be recorded on a recording medium 107.

A secondary storage device 108, which is a non-volatile storage device, such as an electrically erasable programmable read-only memory (EEPROM), stores a program (firmware) for controlling the image capturing apparatus 100 and various types of setting information, and is used by the CPU 103.

The recording medium 107 is used to record image data obtained by shooting and stored in the primary storage device 104. The recording medium 107 is detachable from the image capturing apparatus 100, like a semiconductor memory card, so that data recorded on the recording medium 107 can also be used by an external apparatus, such as a personal computer. Thus, the image capturing apparatus 100 includes an attachment and detachment mechanism and a writing and reading function for the recording medium 107.

A display unit 109 has the function to display, on a display medium, such as a liquid crystal display, in response to an instruction from the CPU 103, information stored for display in the primary storage device 104. In the present exemplary embodiment, the display unit 109 further has a live-view (viewfinder) function that sequentially displays at least a part of images serially acquired by the image sensor 102. Further, the display unit 109 has a display function that reproduces and displays a recorded image recorded on the recording medium 107 after shooting and that displays a graphical user interface (GUI) for interactive operations.

An operation unit 110 is a group of input devices for receiving a user operation and transmitting input information to the CPU 103, and may include, for example, a button, a lever, and a touch panel, as well as an input device using a speech or a visual line. In the present exemplary embodiment, the image capturing apparatus 100 has a plurality of patterns of image processing to be applied to a captured image, and is capable of setting an image capturing mode as one of the patterns via the operation unit 110. Furthermore, the operation unit 110 detects a user operation on the touch panel included in the display medium used for display by the display unit 109.

The image processing unit 106 performs image processing called development processing, as well as color tone adjustment according to a shooting mode. The image processing includes, for example, interpolation processing, such as demosaicing, white balance processing, correction processing for aberration and distortion, sharpness, gamma processing, matrix calculation, and color conversion processing using a look-up table or the like. The image processing unit 106 further performs display processing, such as resizing and gamma conversion, for display on the display unit 109, and recording processing, such as encoding and compression, for recording on the recording medium 107. Furthermore, the image processing unit 106 performs processing for generating a panning shot image in the present exemplary embodiment. A plurality of images to be combined and image data generated during the processing process are stored in, for example, the primary storage device 104. Also, at least a part of the functions of the image processing unit 106 may be implemented by the CPU 103 in a software way.

Figure 2:
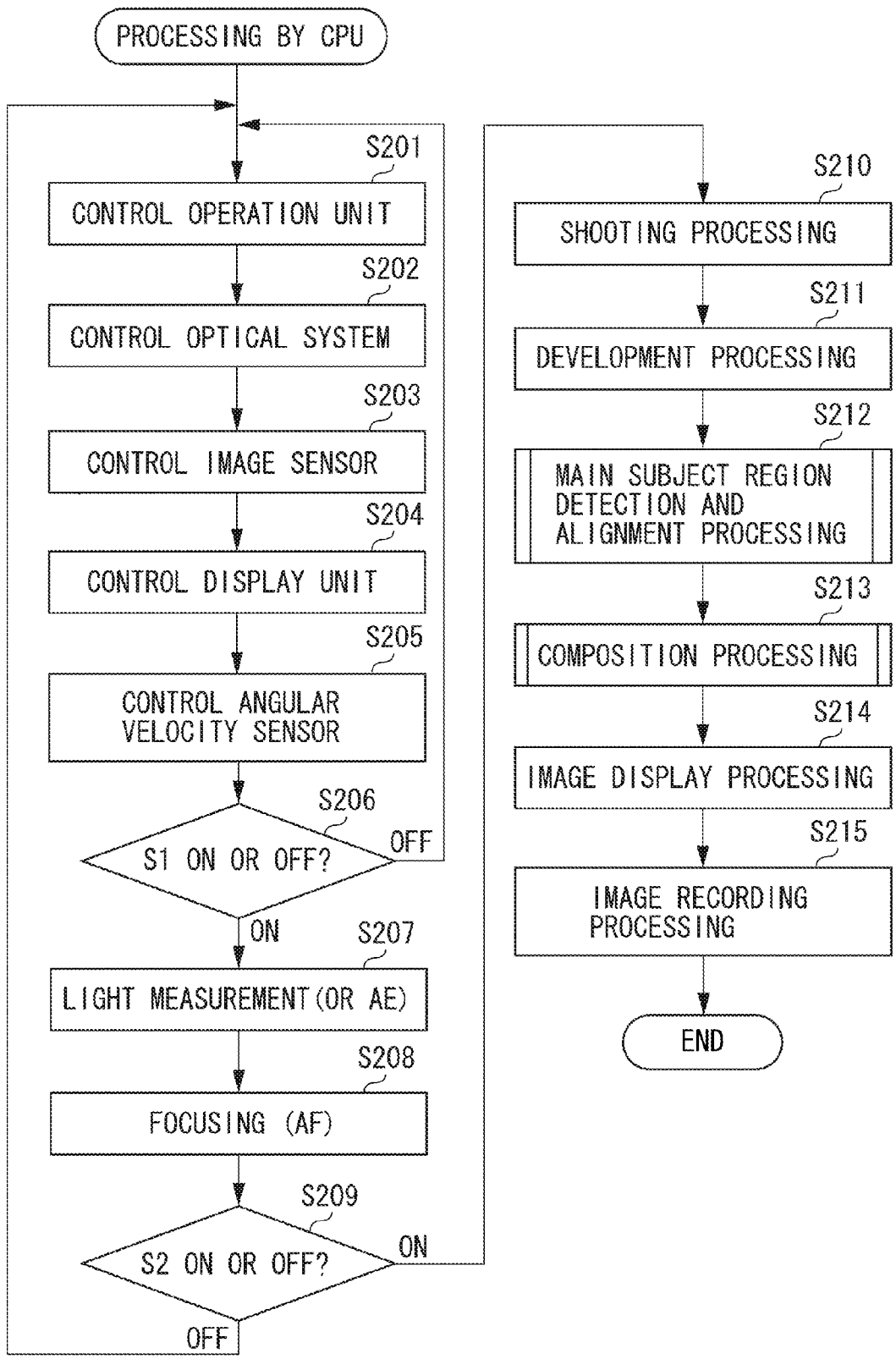
FIG. 2 is a flowchart illustrating processing performed by a central processing unit (CPU) according to the first and second exemplary embodiments.

FIG. 2 is a flowchart illustrating processing performed by the CPU 103 for shooting and recording in a panning shooting mode.

In the present exemplary embodiment, instructions for shooting and recording an image have two stages in such a manner that an instruction S1 (to be described below) from the operation unit 110 is an instruction for preparing for shooting and an instruction S2 (to be described below) from the operation unit 110 is an instruction for actually shooting and recording an image. In the present exemplary embodiment, the user can input the instructions S1 and S2 such that the instruction S1 is associated with the half press of a shutter button on the operation unit 110 and the instruction S2 is associated with the full press of the shutter button on the operation unit 110. In addition, in a case where the operation unit 110 is a touch panel, various touch operations on the touch panel can be associated with the instructions S1 and S2.

In step S201, the CPU 103 receives a user input from the operation unit 110.

In step S202, the CPU 103 adjusts the setting of the focal length, the shutter speed, and the aperture value of the optical system 101 based on the input information.

In step S203, the CPU 103 adjusts the setting of the ISO sensitivity or the like of the image sensor 102 based on the input information.

In step S204, the CPU 103 provides, to the user via the display unit 109, information about the changed setting.

In step S205, the CPU 103 receives information about the angular velocity of the image capturing apparatus 100 detected by the angular velocity sensor 105. Further, the CPU 103 can always execute step S205 in the same way as in steps S202 and S203 to embed, as image information in the image data, information about the angular velocity as well as information about the focal length, the shutter speed, the aperture value, and the ISO sensitivity. This facilitates reprocessing of a shot image within the image capturing apparatus 100 or post-processing of a shot image via a PC application. Information about the angular velocity may be the angular velocity itself, or may be an angle or an angular displacement changed between images.

The order of steps S201 to S205 is not a restrictive one, but may be freely changed depending on processing.

In step S206, the CPU 103 determines the presence or absence (ON or OFF) of input of the instruction S1 from the operation unit 110. The CPU 103 repeats operations in steps S201 to S205 unless the instruction S1 is input from the operation unit 110.

If the CPU 103 determines the presence of input of the instruction S1 (ON in step S206), the processing proceeds to step S207.

In step S207, the CPU 103 measures the brightness via a light metering sensor included in the optical system 101. Further, in the case of an auto exposure (AE) mode, which performs automatic exposure control, the CPU 103 automatically adjusts an exposure using the shutter speed, the aperture value, and the ISO sensitivity.

In step S208, in the case of an autofocus (AF) mode, which performs automatic focus adjustment control, the CPU 103 measures the subject distance via a distance measurement sensor included in the optical system 101 or arranged in the image sensor 102, and performs focus adjustment based on the defocus amount.

The order of steps S207 and S208 is not a restrictive one, but may be freely changed depending on processing.

In step S209, the CPU 103 determines the presence or absence (ON or OFF) of input of the instruction S2 from the operation unit 110. The CPU 103 repeats operations in steps S201 to S208 unless the instruction S2 is input from the operation unit 110. In addition, in step S209, the CPU 103 may determine whether the instruction S1 from the operation unit 110 is continuing being input. If the CPU 103 determines that the instruction S1 from the operation unit 110 is not continuing being input (OFF), the processing may return to step S201.

If the CPU 103 determines the presence of input of the instruction S2 (ON in step S209), the processing proceeds to step S210.

In step S210, in response to the shooting instruction S2 from the operation unit 110, the CPU 103 captures a number of images required for panning processing. On this occasion, in the case of the panning shooting mode, the user is supposed to perform a shooting operation while panning the image capturing apparatus 100 (or a part thereof including the image sensor 102) to obtain a panning shooting effect. The number of images to be used for panning shooting may be previously set by the user, or may be automatically calculated based on the speed of a moving subject, the amount of panning, and the setting for the degree of blurring a background, as described below.

In step S211, the CPU 103 causes the image processing unit 106 to perform the above-described development processing on image data acquired by shooting in step S210.

In step S211, the CPU 103 detects a main subject region by detecting motion vectors in each divided area between a plurality of images, and performs alignment processing in the detected main subject region. In the present exemplary embodiment, the main subject region indicates a subject region detected distinctively from a background region (to be described below) within the image frame of a shot image. The subject in the main subject region may include, for example, a plurality of persons. Furthermore, in the present exemplary embodiment, the region of a subject that is moving greatly (a moving object region) is supposed to be detected as the main subject region for panning shooting. Thus, a subject remaining stationary in a plurality of shot images (a stationary object), other than the main subject region, is treated as the background. However, as described in the foregoing, in a case where panning shooting is supposed to be performed, when a comparison is made between images, a subject appearing to make a movement corresponding to the amount of panning in the direction opposite to the panning direction is originally a stationary subject. A subject appearing to make a movement corresponding to the amount of panning in the panning direction is determined as a moving object. The details thereof are described below. On the other hand, in a case where shooting is performed in a stationary manner with a tripod or the like, a region in which motion vectors are greatly detected is considered as a main subject region.

In step S213, the CPU 103 combines a plurality of images on which alignment processing has been performed in step S212 by the image processing unit 106 to match the respective main subject regions, and thus generates a composite image as a panning shot image. The method for generating a composite image that provides a visual effect similar to that of panning shooting includes a plurality of methods. In the case of the present exemplary embodiment, alignment processing is performed between a plurality of images, in which a main subject region is shot, in such a manner as to match the main subject regions, and the processed plurality of images is added to each other. Further, blur processing is performed on a background region different from the main subject region in the composite image. Furthermore, the method for generating a final composite image is not restricted to the above method. For example, blur processing (filter processing) is applied to a background region in a plurality of shot images at the amount of blurring based on the amount of movement of the background region between images, alignment processing is performed on a plurality of images, in which a main subject region is shot, in such a manner as to match the main subject regions, and a composite image is generated by arithmetically averaging the plurality of images. Here, the amount of movement of the background region can be calculated based on the angular velocity acquired by the angular velocity sensor 105. In addition, an image obtained by combining an image obtained by blurring a composite image in the above-described way with the composite image obtained before blurring may be treated as a final composite image. An image obtained after composition processing is illustrated in FIG. 11. An image 1104 is generated by performing composition processing in step S213 based on images 1101, 1102, and 1103. In the image 1104, a vehicle, which is a moving object and a main subject, appears clearly, and a tree, which is a background, appears streaming.

Referring back to FIG. 2, in step S214, the CPU 103 displays, on the display unit 109, image data obtained by performing, via the image processing unit 106, display processing on the composite image generated in step S213 or the original image data obtained before composition processing.

In step S215, the CPU 103 records, on the recording medium 107, image data obtained by performing recording processing, such as encoding and compression, on the composite image generated in step S213 or the original image data obtained before composition processing. In addition, in the present exemplary embodiment, the setting of a recording image further includes recording of a RAW image, which is not subjected to development processing, and recording of a Joint Photographic Experts Group (JPEG) image, which is subjected to development processing and is compliant with the JPEG standard. Depending on the setting of a recording image, the development processing in step S211 or the encoding in step S215 may not be applied to the recording image data.

Moreover, in the present exemplary embodiment, the main subject detection processing in step S212 and the panning composition processing in step S213 are performed on the image subjected to the development processing in step S211. However, this is not a restrictive one. Both the processing operations can be applied to an image obtained before development processing.

FIG. 3A is a flowchart illustrating the details of processing for detecting a main subject region (a moving object region) and processing for alignment between images in the main subject region, which are performed in step S212 in FIG. 2.

In step S301, the CPU 103 sets searching blocks, which are obtained by dividing an image into a plurality of areas, and detects motion vectors between images for each searching block.

In step S302, the CPU 103 counts the number of approximately similar motion vectors from among the detected motion vectors. FIG. 3B illustrates a result of the counting in a histogram with the horizontal axis indicating the size of a vector and the vertical axis indicating the number (frequency) of vectors. The horizontal axis distinguishes the directions of motion vectors with the boundary set to "0". First, the CPU 103 sets, as a reference, the amount of movement 310 of the background based on the shaking detected by the angular velocity sensor 105 (i.e., motion information of an image capturing unit between a plurality of images), and, as illustrated in FIG. 3B, classifies motion vectors into a main subject component 311, which is distant from the amount of movement of the background, and a background component 312, which is near the amount of movement of the background. Next, the CPU 103 sets, as main subject vectors 313, motion vectors the number of which is the largest among the motion vectors in the main subject component 311.

In addition, the CPU 103 can distinguish between a main subject and a background based on a histogram of motion vectors without using information about the shaking detected by the angular velocity sensor 105. For example, in a case where panning shooting is performed by a user's panning operation, since a main subject is supposed to be located approximately near the center of every image, a region corresponding to motion vectors the size of which is almost zero and which gather in a contiguous region within each image is considered as a main subject region. However, since erroneous detection of motion vectors may occur depending on the size of a searching region of motion vectors, the method using shaking information obtained by the sensor, as in the present exemplary embodiment, can more accurately distinguish between a main subject and a background.

In step S303, the CPU 103 identifies motion vectors corresponding to the main subject region in the above-described way. In the present exemplary embodiment, the CPU 103 converts a signal from the angular velocity sensor 105 at the time of shooting of each image into the amount of movement of the image capturing apparatus 100 between images, estimates the amount of movement of the background between target images based on the amount of movement of the image capturing apparatus 100, and distinguishes between motion vectors of the background, which remains stationary, and the other vectors. Then, the CPU 103 estimates motion vectors the number of which is the largest among all motion vectors except the motion vectors corresponding to the background to be motion vectors corresponding to the main subject. While, in the present exemplary embodiment, the angular velocity of the image capturing apparatus 100 is detected by the angular velocity sensor 105, this is not a restricted one. For example, an acceleration sensor, a position measuring sensor, or the like may be used to detect the acceleration or displacement of the image capturing apparatus 100, which is then converted into the amount of movement of the image capturing apparatus 100 between images. Furthermore, in the present exemplary embodiment, it is presumed that shooting is performed with panning, the CPU 103 distinguishes motion vectors of the background in the above-described way as a method for determining motion vectors of the main subject. In a case where the method for distinguishing motion vectors of the background based on a signal from the angular velocity sensor 105 is not employed, the CPU 103 considers motion vectors the number of which is the second largest as motion vectors of the main subject. Alternatively, the CPU 103 estimates motion vectors of the main subject by detecting whether a region having the motion vectors exists in a certain degree of cluster. Moreover, in a case where it is presumed that shooting is performed with the image capturing apparatus 100 fixed to a tripod, the CPU 103 can simply determine that motion vectors the number of which is the largest on an image are motion vectors of the main subject. In addition, the CPU 103 may treat motion vectors in the image horizontal direction and those in the image vertical direction separately or may treat the motion vectors collectively.

In step S304, the CPU 103 performs alignment of images by shift movement within memory of the primary storage device 104 based on values of the motion vectors of the main subject in such a manner that the position of the main subject matches the reference image.

Finally, in step S305, the CPU 103 determines whether any image targeted for alignment remains. Thus, as long as an image targeted for alignment remains (YES in step S305), the processing returns to step S301 to perform alignment processing for the next image. When alignment processing for all the images has been completed (NO in step S305), the processing in step S212 illustrated in FIG. 2 ends.

Figure 3C:
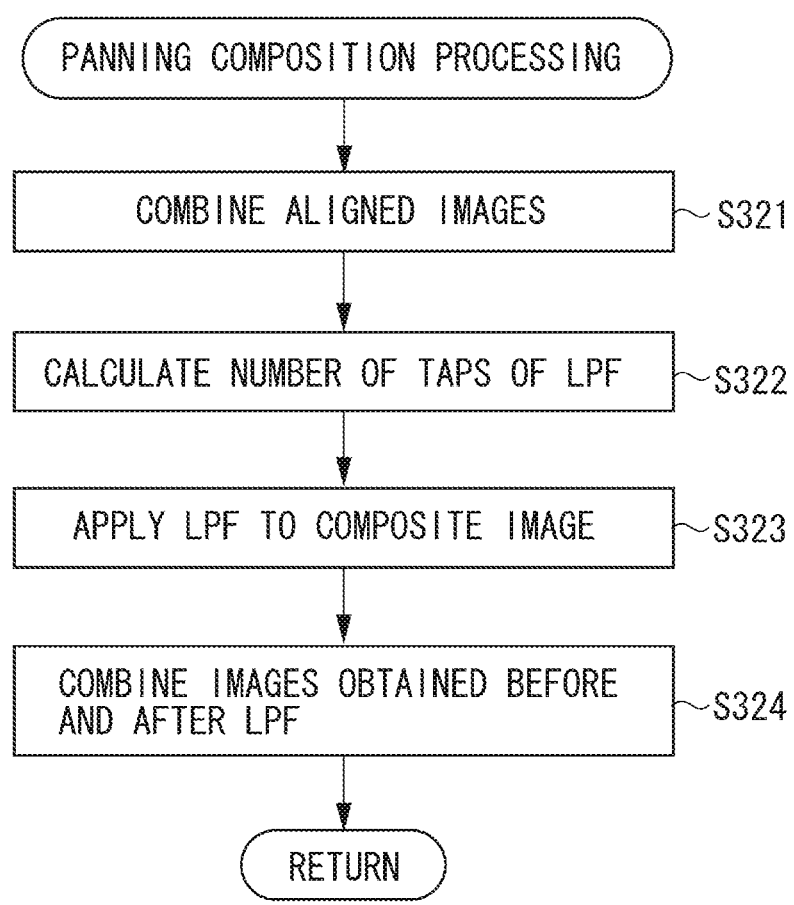
Figure 4:
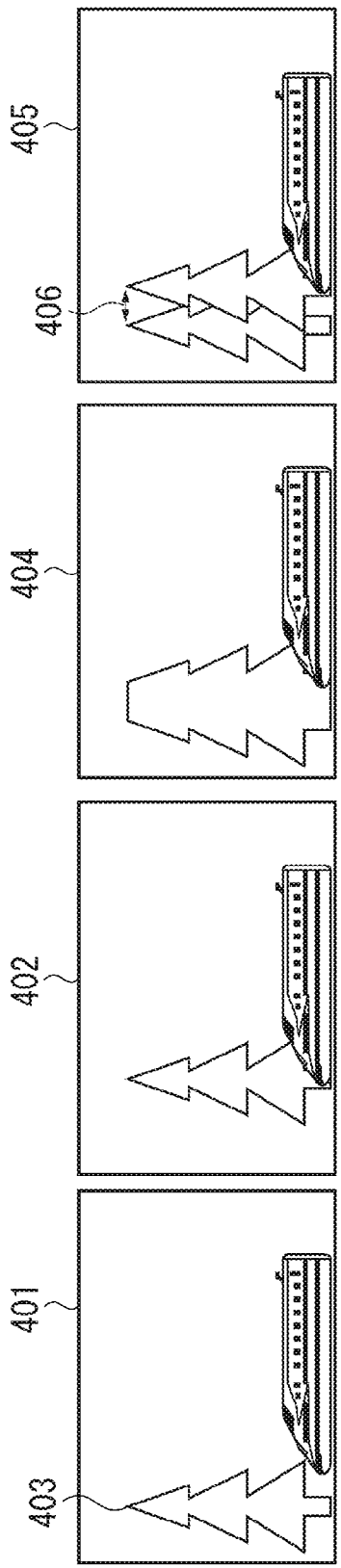
FIG. 4 is a first explanatory diagram illustrating processing for calculating the number of taps of low-pass filtering (LPF) according to the first exemplary embodiment.

FIG. 3C is a flowchart illustrating the details of (panning) composition processing performed in step S213 illustrated in FIG. 2.

In step S321, the CPU 103 combines a plurality of images aligned in step S304 illustrated in FIG. 3A to generate a first composite image in which a change in even the main subject with time is expressed with shaking thereof reduced. For example, when a running person is supposed to be a main subject, a motion of his or her arms swinging can be expressed by image composition. The first composite image is used mainly for a main subject region in a final composite image.

In step S322, the CPU 103 calculates the number of taps of low-pass filtering (LPF) to be applied to the composite image obtained in step S321. As will be described below in detail, the number of taps of LPF is calculated as the number of taps required to compensate for an insufficient number of pixels for streaming the background according to the amount of movement of the background, to which a streaming image effect is to be applied. Furthermore, in a case where the user specifies the manual or automatic setting of the degree of streaming of the background, the CPU 103 calculates the number of taps required to obtain the amount of blurring corresponding to the specified setting of the degree of streaming.

In step S323, the CPU 103 applies LPF having the calculated number of taps to the composite image generated in step S321 to generate a second composite image in which the background is expressed as being streaming. While, in the present exemplary embodiment, LPF is applied to the first composite image generated in step S321, LPF may be applied to each image obtained before image composition and the LPF-applied images may be combined to generate a second composite image.

In step S324, the CPU 103 combines the first composite image generated in step S321 with the LPF-applied, second composite image generated in step S323, using information about the main subject region detected in step S212 illustrated in FIG. 2. At this time, the CPU 103 generates a third composite image having an effect similar to that of panning shooting by performing image composition in such a manner that the first composite image generated in step S321 is mainly used for the main subject region and the second composite image generated in step S323 is mainly used for the background region.

Next, the concept of calculation of the number of taps of LPF in step S322 illustrated in FIG. 3C is described with reference to FIG. 4 and FIGS. 5A, 5B, 5C, 5D, and 5E. In the case of general panning shooting, since shooting is performed with a single exposure, the background changes as if being continuously streaming. Thus, for example, referring to FIG. 4, it is desirable that a background 403 in the first image 401 and that in the subsequent, second image 402 are blurred to become a background in a composite image 404 obtained by combining the first image 401 with the second image 402. However, if the first image 401 is simply combined with the second image 402, the background may be expressed in a discrete manner as in a composite image 405. Therefore, in the present exemplary embodiment, the CPU 103 compensates for pixels that are lacking in the background 403, which do not exist in a portion expressed with the amount of movement 406 of the background, and expresses a connected and extended background as in the image 404.

Thus, in the present exemplary embodiment, the CPU 103 generates an image in which the background is appropriately streaming, by using a filter set according to the panning direction of the image capturing apparatus 100 (the predetermined direction) and having such a number of taps as to compensate for insufficient pixels between discrete backgrounds displayed in the composite image 405. For example, if the amount of movement 406 of the background is supposed to correspond to five pixels, the CPU 103 sets a low-pass filter for 1×5 pixels or more. Further, the CPU 103 sets the reference pixel on the filter depending on the panning direction, for example, to the right end if panning is performed leftward. The CPU 103 sets the filter in this way and performs filter processing on the background region in the composite image so as to generate a panning-like composite image in which the background appears to be continuously streaming.

Moreover, in the present exemplary embodiment, the CPU 103 performs the following control so as to obtain, in the composite image, an effect similar to that when shooting is performed at a predetermined shutter speed set by the user (hereinafter referred to as an equivalent shutter speed). More specifically, the CPU 103 determines the number of images to be combined according to the number of shot frames per unit time (or the frame rate) so as to generate a composite image as if shot at the equivalent shutter speed set by the user. For example, in a case where images are shot at a speed of 60 frames per second, the CPU 103 generates a composite image from one image when the equivalent shutter speed set by the user is 1/60 seconds or less, and from three images when the equivalent shutter speed set by the user is 1/20 seconds. In this way, the CPU 103 determines the number of images to be combined such that the total of shooting times corresponds to the equivalent shutter speed. In addition, even if images the number of which is less than the number corresponding to the equivalent shutter speed are combined, the amount of blurring of the background region only needs to be increased to a corresponding degree.

Figure 5A:
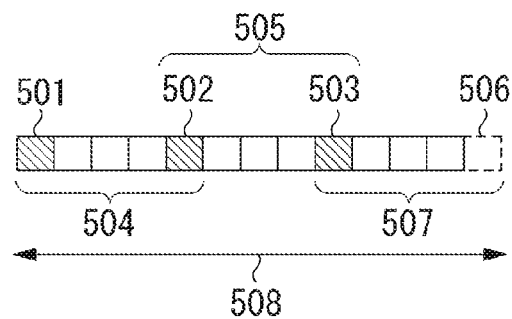
FIGS. 5A, 5B, 5C, 5D, and 5E are second explanatory diagrams illustrating processing for calculating the number of taps of the LPF according to the first exemplary embodiment.
Figure 5B:
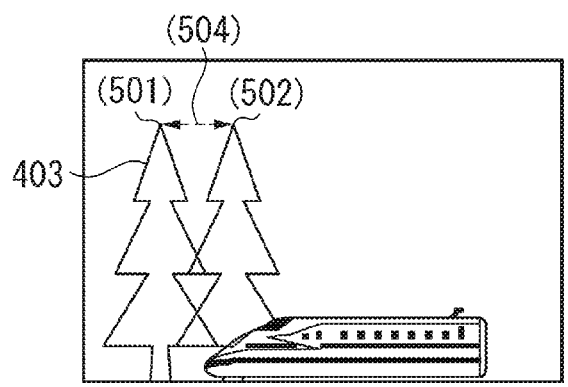
Figure 5C:
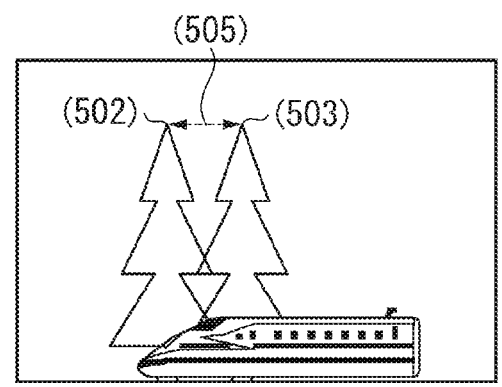
Figure 5D:
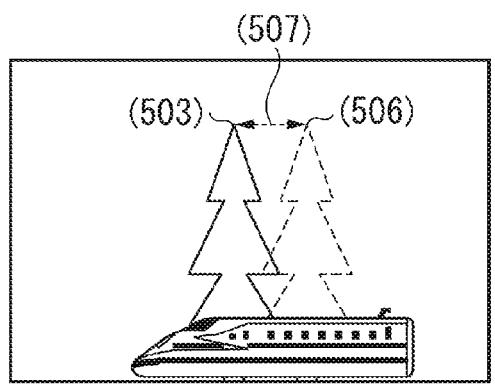
Figure 5E:
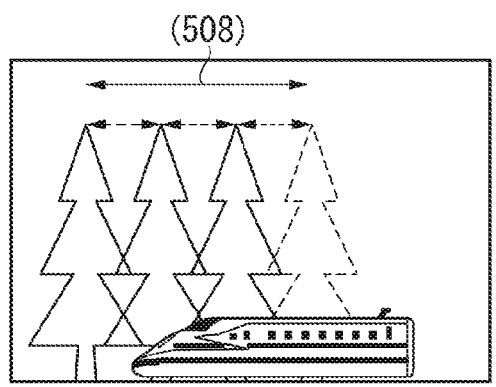

For example, each of FIGS. 5B and 5C in FIGS. 5A to 5E illustrates an image obtained by combining two temporally-continuous images which the user has shot while panning the image capturing apparatus 100 with a main subject set to a vehicle located in the middle of each image. FIG. 5B illustrates a composite image obtained by combining the first shot image and the second shot image when shot images are arranged in the time-serial order, and FIG. 5C illustrates a composite image obtained by combining the second shot image and the third shot image. FIG. 5D illustrates the third shot image, in which a tree, as the background, depicted with the broken line indicates a position to which the tree would appear streaming when the user has performed panning shooting during exposure while panning the image capturing apparatus 100.

FIG. 5A illustrates the concept of setting of the number of taps of LPF. Suppose that the user has set 1/20 seconds as the equivalent shutter speed for the final composite image and has shot three images at a speed of 60 frames per second. Referring to FIG. 5A, the reference pixel 501 in a predetermined position of the background has changed to the reference pixel 501, the reference pixel 502, and the reference pixel 503 in this order when the first shot image, the second shot image, and the third shot image have been obtained. At this time, it is necessary to interpolate for an interval 504 between the reference pixel 501 and the reference pixel 502 and an interval 505 between the reference pixel 502 and the reference pixel 503 in such a manner that pixels are contiguous in each interval. Furthermore, in a case where shooting has been performed with the exposure at the set equivalent shutter speed even during panning, since the background also streams between the reference pixel 503 and the reference pixel 506, it is also necessary to interpolate for an interval 507 between the reference pixel 503 and the reference pixel 506 in such a manner that pixels are contiguous in that interval. Accordingly, the CPU 103 applies, to the composite image, LPF having a number of taps corresponding to the interval 504 (alternatively, the interval 505 or the interval 507), and sets the overall streaming amount as the streaming amount 508.

The method for calculating the number of taps of LPF corresponding to the interval 504, in other words, the method for calculating the amount of movement of the background between images, may be any one of the method for analyzing a plurality of images in the above-described way and the method for measurement using the angular velocity of the image capturing apparatus 100. In the case of the method for analyzing a plurality of images, the CPU 103 calculates, as the amount of movement of the background, representative motion vectors of the background from a histogram of motion vectors in each region as in steps S301 to S303. FIG. 6 illustrates an example of processing for calculating a motion vector 604 as one of motion vectors of the background 603 between images 601 and 602 from a histogram such as that illustrated in FIG. 3B.

Here, the method for calculating the amount of movement of the background based on the angular velocity of the image capturing apparatus 100 is described with reference to FIG. 7 and the following formula (1):

$$\text{amount of movement of background} \approx \frac{f \tan\left(-\frac{\bar{\omega}}{fps}\right)}{pp} \begin{bmatrix} f\text{: focal length} \\ \bar{\omega}\text{: average angular velocity} \\ fps\text{: frame rate} \\ pp\text{: pixel pitch} \end{bmatrix}$$

Figure 7:
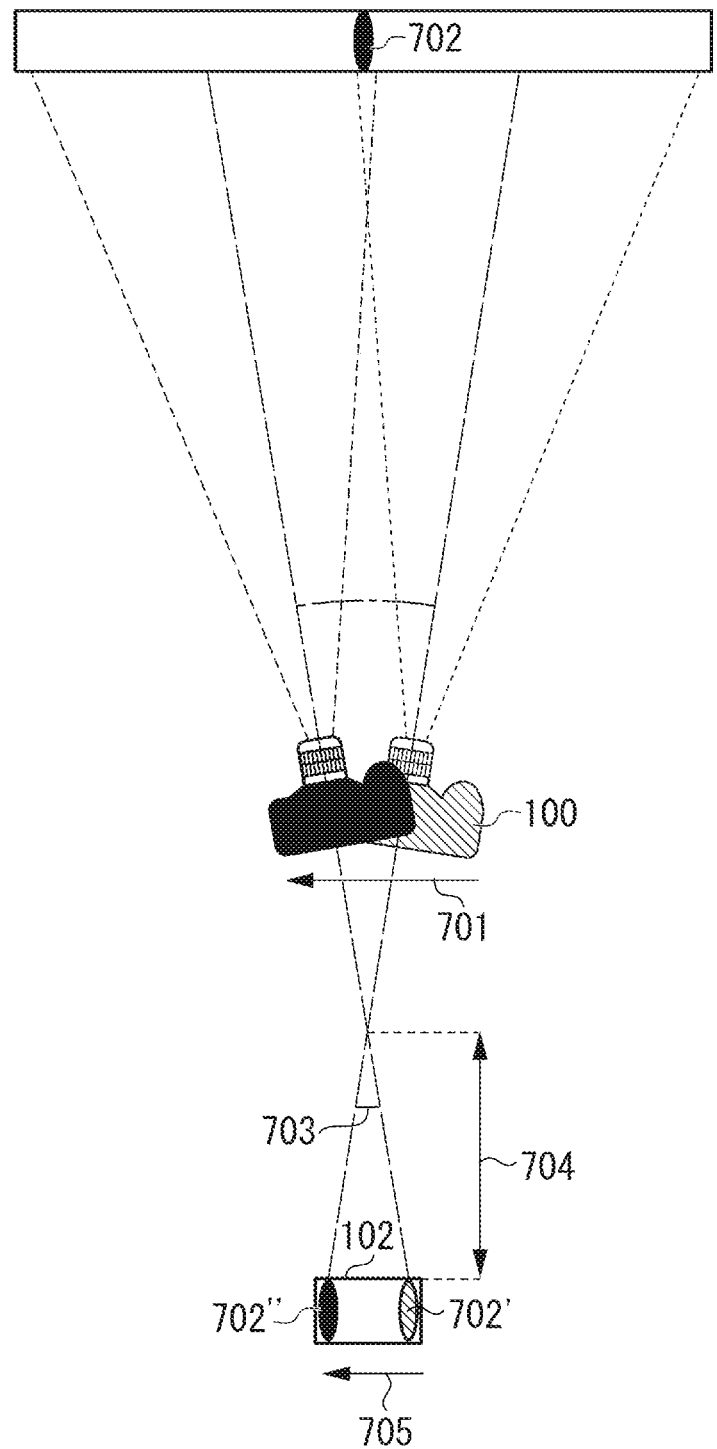
FIG. 7 illustrates an example of processing for calculating the amount of movement of a background using the angular velocity of the image capturing apparatus according to the first and second exemplary embodiments.

FIG. 7 illustrates how the background that remains stationary moves on the imaging plane when the image capturing apparatus 100 rotates due to panning or the like.

When the user shoots a subject 702, which remains stationary, while panning the image capturing apparatus 100 as indicated by the arrow 701, the subject 702, which remains stationary, moves from the position 702' to the position 702" on the image sensor 102.

The CPU 103 calculates the amount of movement of the above-described subject 603, which remains stationary, on the image using formula (1).

As expressed in formula (1), the amount of movement 705 of the stationary subject, i.e., the background, on the image can be calculated from the angle of movement 703 of the image capturing apparatus 100 and the focal length f (704) of the optical system 101. The CPU 103 calculates the angle of movement 703 based on the angular velocity ω of the image capturing apparatus 100 detected by the angular velocity sensor 105, the number of shot frames per unit time (frame rate fps), and the number of images n between images to be sampled. Finally, the CPU 103 converts the amount of movement 705 of the background into the number of pixels based on the pixel pitch pp. Then, as described above, the CPU 103 treats the number of taps corresponding to the amount of movement 705 of the background as the number of taps of LPF to be used for the current blur processing.

The angle of movement 703 may be calculated each time with precision from the angular velocity corresponding to each image or may be calculated in a lump from the average angular velocity of all images.

Figure 8:
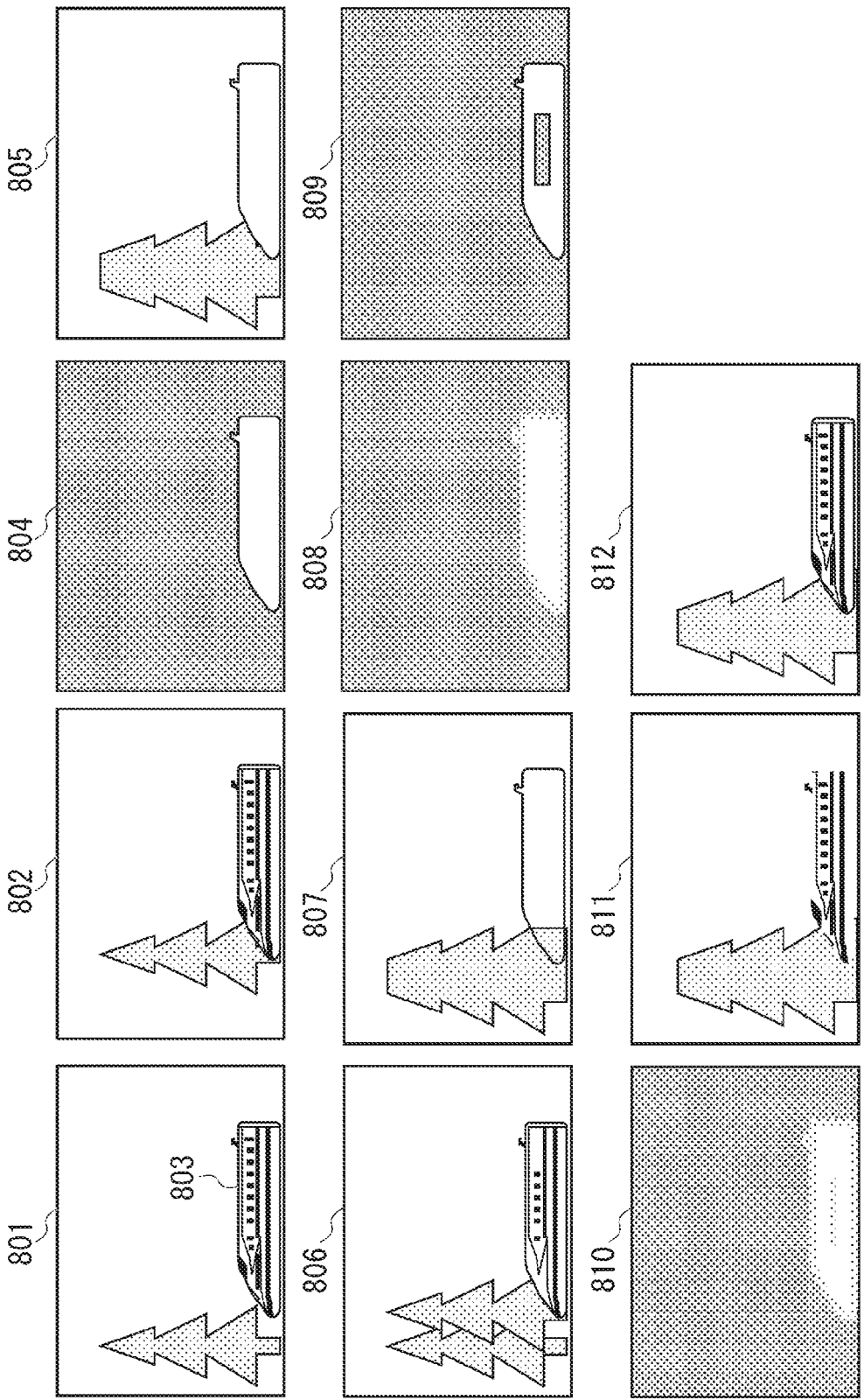
FIG. 8 is an explanatory diagram illustrating processing by the LPF according to the first and second exemplary embodiments.

Next, the details of LPF processing applied to a composite image in step S323 illustrated in FIG. 3C are described with reference to FIG. 8.

Suppose that a main subject exits in images 801 and 802. Further suppose that, in the main subject region detection performed in step S212 illustrated in FIG. 2, a main subject region map obtained by binarizing regions in an image based on motion vectors of the subject can be accurately separated at the boundary between the main subject and the background, as a main subject region map 804. At this time, during image composition in step S324, it is almost unnecessary to use pixels of the main subject region for an image subjected to LPF processing, i.e., a background image 805. Therefore, the CPU 103 generates the background image 805 by extracting the main subject region in the above-described way and applying LPF having the number of taps set in the above-described way to pixels of a region other than the main subject region, i.e., the background region.

Finally, in step S324, the CPU 103 selects the main subject region from the main subject image (first composite image) 806 and selects the background region from the background image (second composite image) 805, and then combines the main subject region with the background region to generate a final composite image. This method causes no image retention around the main subject when the main subject has been accurately detected, but may cause an unnatural boundary between the main subject and the background when the main subject has not been accurately detected. To take measures against an unnatural boundary occurring, such filter or blur processing as to blur the boundary between the main subject and the background may be performed as boundary processing. However, only blur processing as boundary processing is applied to a region that is erroneously determined as a main subject region, so that the erroneously-determined region still appears unnatural. Example of a case where the main subject region cannot be accurately extracted include a case where there is almost no contrast difference in the boundary between the main subject and the background. In addition, when motion vectors cannot be accurately detected, even the background may be extracted as the main subject region, or a part of the main subject may be classified as the background region. Therefore, the application of the above-described method may depend on subjects.

In contrast to the above-described method, the following method can be employed. In this method, the CPU 103 interpolates for pixels within the main subject region using pixels around the main subject region based on information on the detected main subject region and then applies LPF to a resultant image to generate a background image 807. Then, the CPU 103 blurs the boundary between the main subject and the background as in a main subject region map 808. In step S324, while weighting the pixel values of the main subject region, the CPU 103 mixes and combines the main subject image 806 with the background image 807 according to the main subject region map 808.

However, even in this method, if such an image is generated as a main subject region 809 in which pixel data of the middle portion thereof drops out, the background may be inserted into or reflected into the main subject region of a composite image.

Therefore, the following method is employed in the present exemplary embodiment. First, the CPU 103 performs blur processing on the main subject region 804 to blur the boundary between the main subject and the background as in a main subject region map 810. According to this processing, even if the dropping-out of pixel data of the middle portion occurs as in the main subject region map 809, it is possible to reduce the adverse effect of the dropping out as in the main subject region map 810. Then, the CPU 103 applies, to the main subject image (first composite image) 806, LPF with a pixel value in the main subject region of the main subject region map 810 set as a coefficient as expressed in formula (2). According to this processing, while blurring the entire image, the CPU 103 generates a background image (second composite image) 811 processed in such a manner that pixels of the main subject region are unlikely to spread around the main subject region.

$$LPF = \dfrac{\sum\limits_{n} \text{pixel} \dfrac{(255 - \text{mask})}{255}}{n} \begin{bmatrix} LPF\text{: pixel value after } LPFP \\ \text{pixel: pixel value before } LPF \\ \text{mask: pixel value in main subject region} \\ n\text{: number of taps} \end{bmatrix} \quad (2)$$

Finally, the CPU 103 mixes and combines the main subject image 806 with the background image 811 with pixels values in the main subject region map 810 set as weights to generate a panning shot image (third composite image) 812. This method has an advantageous effect not only on the reduction of spread of pixels of the main subject region around there but also the measures against the dropping-out of pixel data of the middle portion. Since blur processing is performed using LPF having coefficients of taps expressed in formula (2), pixels located around the main subject region and recognized as the main subject region become less likely to be used, and pixels of a low-contrast region also become a merely blurred image, which is hardly conspicuous. Furthermore, since the pixels recognized as the main subject region are combined with the main subject image, the unnaturalness of a region erroneously recognized as the main subject region becomes more inconspicuous.

As described above, in the present exemplary embodiment, the CPU 103 aligns and combines images in which a subject is not blurred due to shaking, and applies blur processing to the background. Accordingly, the CPU 103 can generate a panning-like composite image having an effect similar to that of a shot image that is captured at such a shutter speed as to make it difficult to perform general panning shooting. Furthermore, since, when combining a plurality of images, the CPU 103 applies blur processing to the background according to the amount of movement of the background with respect to the main subject, the CPU 103 can generate a more effective panning-like composite image. Moreover, since the CPU 103 controls the number of images to be combined according to a shutter speed corresponding to panning shooting desired by the shutter, the CPU 103 can generate a more effective panning-like composite image.

While, in the first exemplary embodiment, the shutter speed for panning shooting to generate a composite image (a shutter speed in the case of a conventional panning shooting) can be set by the user via the operation unit 110, the desired amount of streaming (streaming amount) of the background as an effect of panning shooting on a final composite image can be set by the user according to a second exemplary embodiment. For example, the user can select the amount of effect from among the previously-set large, medium, and small effects to perform panning shooting. For example, the amount of effect is changed by setting the amount of blurring such that the amount of blurring is n pixels, 2n pixels, and 3n pixels when the user selects the small effect, the medium effect, and the large effect, respectively. In addition, the amount of effect can be previously set to a desired breadth by the user.

The configuration of the image capturing apparatus 100 is similar to that of the first exemplary embodiment, and the description thereof is, therefore, not repeated.

Figure 9:
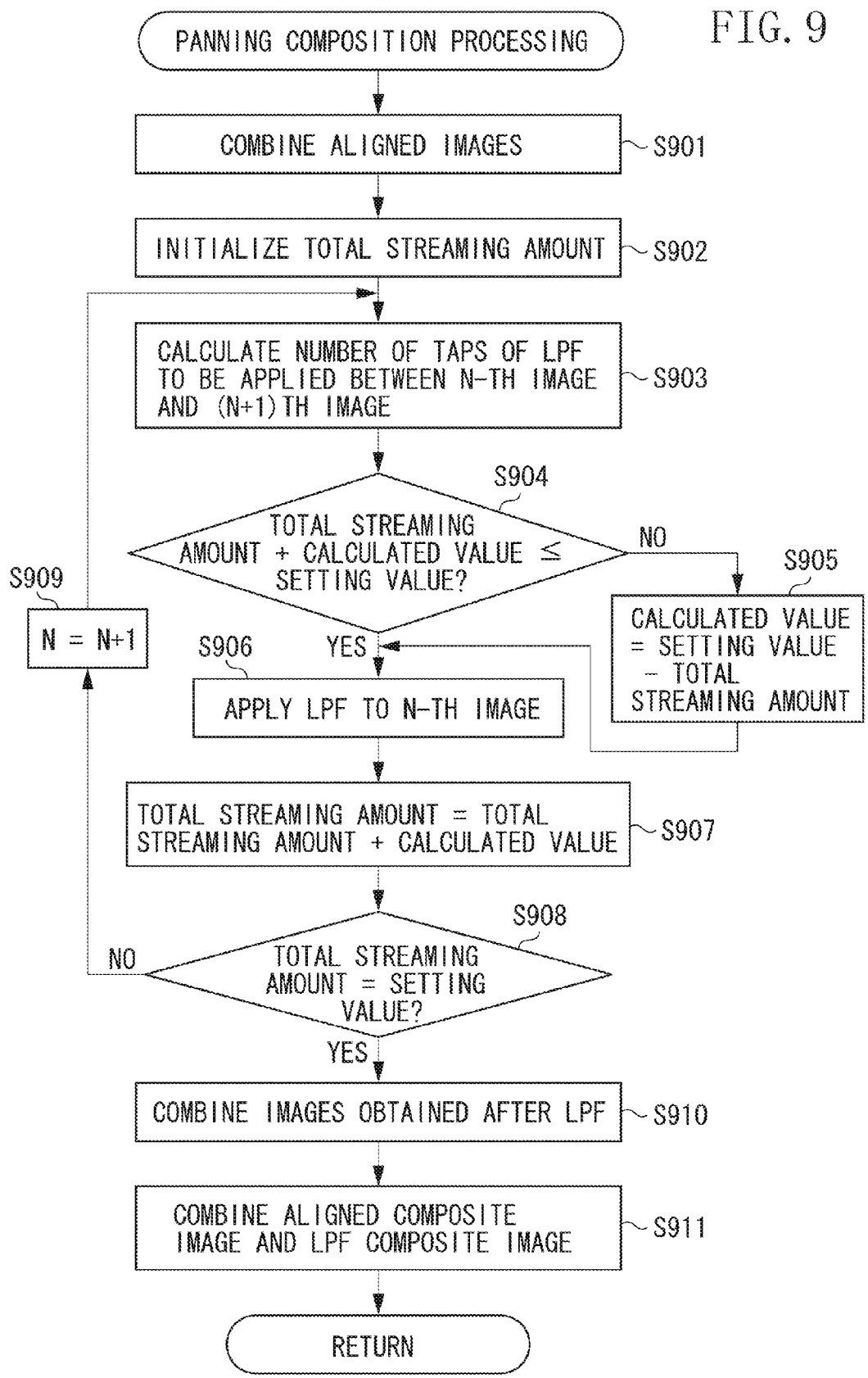
FIG. 9 is a flowchart illustrating panning composition processing according to the second exemplary embodiment.

FIG. 9 is a flowchart illustrating the details of panning composition processing performed in step S213.

In step S901, the CPU 103 combines a plurality of images aligned in step S212 to generate an image in which a change of a main subject with time is expressed with reduced blur.

In step S902, the CPU 103 initializes a variable storing the total streaming amount that is currently applied to a target image.

In step S903, the CPU 103 calculates, as a calculated value, the number of taps of LPF to be applied between two images aligned in step S212. The details of a method for calculating the number of taps are described below.

In step S904, the CPU 103 determines whether the streaming amount of a composite image obtained by combining up to the current target image does not exceed the setting value of the above-described amount of effect (streaming amount) set by the user when LPF having the calculated number of taps is applied to the current target image, by performing comparison operation between "the total streaming amount+the calculated value" and "the setting value".

If the CPU 103 determines that "the total streaming amount+the calculated value" exceeds "the setting value" (NO in step S904), the processing proceeds to step S905. In step S905, the CPU 103 sets "the setting value−the total streaming amount" as a new calculated value, thus preventing "the total streaming amount+the calculated value" from exceeding "the setting value".

If the CPU 103 determines that "the total streaming amount+the calculated value" does not exceed "the setting value" (YES in step S904), the processing proceeds to step S906. In step S906, the CPU 103 applies LPF to the first shot image of the two images to compensate for deficient pixels.

In step S907, the CPU 103 adds the calculated streaming amount for the current LPF to the total streaming amount.

In step S908, the CPU 103 determines whether the total streaming amount reaches the set amount of effect.

If the CPU 103 determines that the total streaming amount does not reach the set amount of effect (NO in step S908), the processing proceeds to step S909 to repeat operations in step S903 to S907 on the next image.

If the CPU 103 determines that the total streaming amount reaches the set amount of effect (YES in step S908), the processing proceeds to step S910.

In step S910, the CPU 103 combines all the images to which LPF has been applied in steps S903 to S908, to generate an image in which the streaming of the background is expressed. In the present exemplary embodiment, the CPU 103 applies, in step S906, LPF processing having the number of taps determined in step S903 to each shot image obtained before composition, and then combines the LPF-processed images in step S910. However, the CPU 103 may retain, for example, the maximum value of the number of taps determined in step S903, and may apply, after composition, LPF processing having the maximum number of taps to an image that is not subjected to adjustment processing in step S905.

In step S911, the CPU 103 combines a composite image obtained by combining aligned images in step S901, i.e., a main subject image (first composite image), with a composite image obtained by combining LPF-processed images in step S910, i.e., a background image (second composite image), thus, generating a third composite image, which has an effect similar to that of panning shooting.

The details of a series of operations about LPF in steps S902 to S910 are described with reference to FIGS. 10A, 10B, 10C, 10D, and 10E. FIG. 10A illustrates the concept of the number of taps of LPF.

In a case where the background 1001 changes to a background 1002, a background 1003, and a background 1006 in this order and the overall streaming amount (total streaming amount) is desired to be set to the amount 1008, it is necessary to interpolate for intervals of the amount of background movement 1004 and the amount of background movement 1005. However, since the total streaming amount 1008 is a final target value (setting value), if an interpolation is performed in such a manner as to fill in the entire interval between the background 1003 and the background 1006, the total streaming amount would exceed the setting value 1008 of the streaming amount desired by the user. This situation corresponds to the determination "NO" in step S904 in FIG. 9. In this case, in step S905, the CPU 103 changes the target value of the number of taps of LPF to a point 1009 between the background 1003 and the background 1006 as illustrated in FIG. 10A, and interpolates for only an interval of the amount of movement 1007, which is between the background 1003 and the point 1009.

The amount of movement 1007 can be calculated from a difference between the total streaming amount 1008, which is a final target value, and the streaming amounts 1004 and 1005 between the background 1001 and the background 1003. In this way, in step S907, the CPU 103 stores, as a current streaming amount, the number of taps of LPF (the amount of blurring) up to the current processing-targeted image, and thus grasps a change in the total streaming amount due to an increase of the number of images to be combined to enable panning shooting composition with an appropriate number of images and an appropriate amount of effect.

The other configuration and flow in the second exemplary embodiment are basically similar to those of the first exemplary embodiment. However, while, in the first exemplary embodiment, the number of taps of LPF is used only to interpolate for deficient pixels, the number of taps of LPF in the second exemplary embodiment is controlled based on the amount of effect of panning shooting.

Furthermore, since the speed of a main subject rarely changes in a short period of time, the CPU 103 may calculate the average value or maximum value of the amount of movement between background images, and may apply LPF having the same number of taps to the first image up to the last but one image based on the calculated value. This method enables the allowable number of images to be combined to be first calculated, thus leading to high-speed processing.

Figure 12:
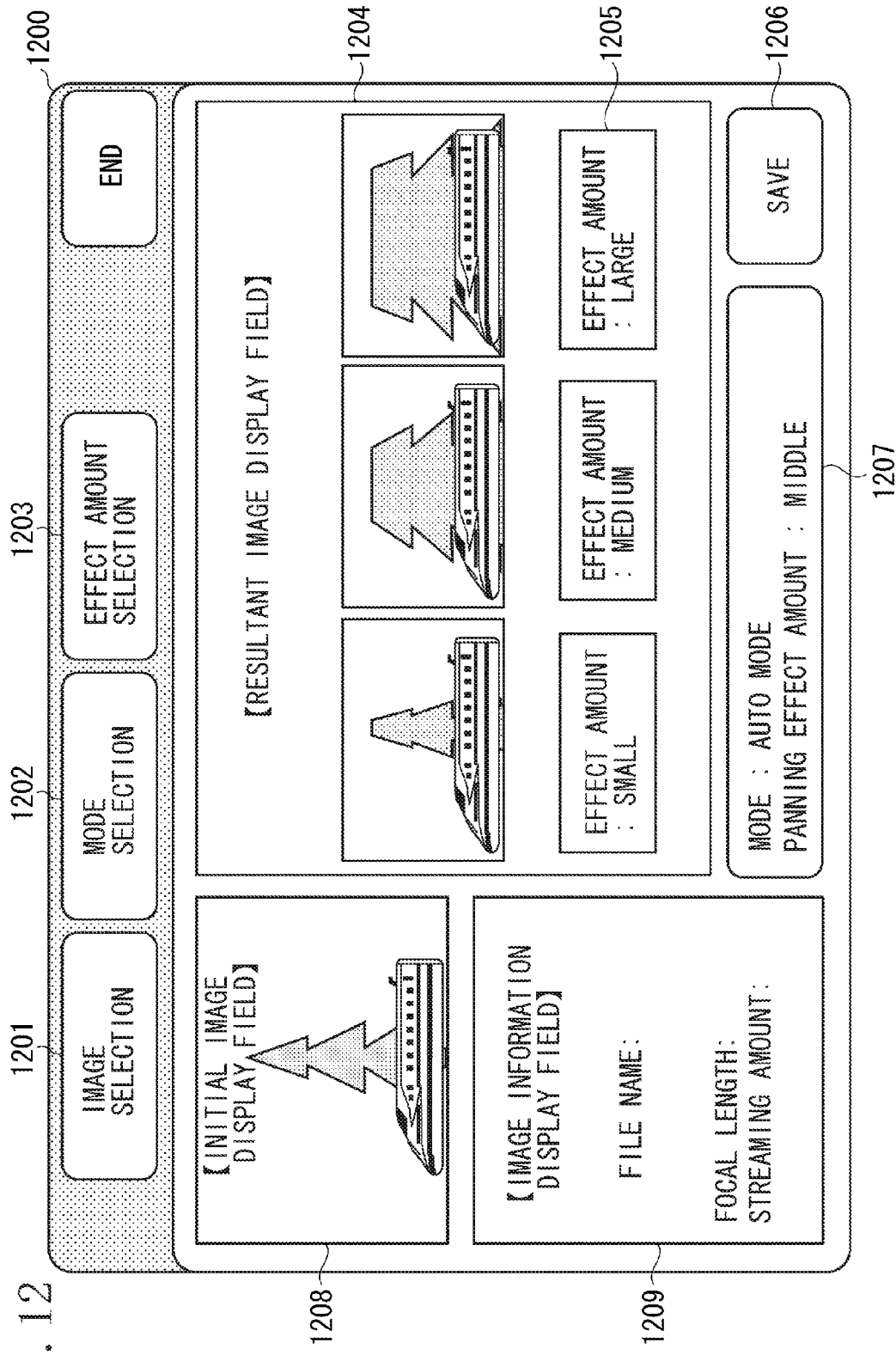
FIG. 12 illustrates an example of a user interface (UI) for panning composition processing according to an exemplary embodiment of the present invention.

FIG. 12 illustrates a screen displayed by the operation unit 105 as an example of a configuration of a user interface (UI) according to each of the above-described exemplary embodiments.

An image selection button 1200 is used to receive an instruction to select an image to which the user desires to apply a panning shooting effect. When the image selection button 1200 is selected via a touch or a cursor, the CPU 103 receives an instruction from the image selection button 1200 and scrolls and displays, or lists and displays, target image candidates or file names of the target image candidates recorded on the recording medium 107.

A mode selection button 1202 is used to receive an instruction to select whether to edit an image manually or automatically. In the case of editing an image manually, the user directly performs selection of a target image or a target image group, selection and adjustment of the amount of effect of panning shooting, etc. In the case of editing an image automatically, the streaming amount is automatically set based on image analysis from a target image or a target image group, and processing is performed based on the set streaming amount. Furthermore, the selection of a target image can also be automatically performed based on header information of the image. For example, an image group obtained by the last continuous shooting may be automatically targeted.

An effect amount selection button 1203 is used to receive an instruction to select the degree to which the background is to be streamed, or the amount of effect of panning shooting. In each of the above-described exemplary embodiments, the streaming amount of the background can be specified by any one of the equivalent shutter speed, the selection of the large, medium, and small effects, and the inputting of the number of pixels. However, this is not a restrictive one. For example, any one of images to be combined may be displayed on a display medium by the display unit 105, and the magnitude of the amount of effect may be displayed with a bar-like icon. Then, the magnitude of the amount of effect can be set by the user moving an index on the bar with a touch operation. Furthermore, when the user drags any portion of the background of the displayed image in a predetermined direction while touching that portion, or touches at least two points defining the starting point and ending point of panning, a composite image in which the streaming amount is expressed by a length specified in the predetermined direction may be generated. The user's operation is not restricted to the above-described operation as long as it is a touch operation capable of specifying the streaming amount.

A resultant image display field 1204 is configured to be able to display a list of a plurality of composite images generated under the respective conditions. The setting value for editing each composite image (the streaming amount or the like) is displayed in an area 1205. While, in FIG. 12, a plurality of composite images is listed with the small effect amount, the medium effect amount, and the large effect amount, a plurality of composite images may be listed with shutter speeds set in three stages. Furthermore, various patterns for selecting images to be combined from among a group of images to be combined may be listed and displayed.

A save button 1206 is used to receive an instruction to record an image displayed on the resultant image display field 1204 on the recording medium 107.

A setting display field 1207 displays the current status, including the current editing mode and the effect amount set in an image to be recorded.

An initial image display field 1208 displays, as an initial image, a selected image or one image of a selected image group. The image displayed as the initial image may be any image of the selected image group. However, for example, the first image in time series or an image located in the middle in time series, which can be a reference for alignment, is displayed. A displayed image may be changed within images selected as an image group when the user touches, or selects via a cursor, a displayed image.

An image information display field 1209 displays image information of any one of the initial image, the entire image group, and the saved composite image. For example, immediately after a resultant image is saved via the save button 1206, only the saved resultant image is displayed in large size at the resultant image display field 1204, and the file name, the focal length, and the streaming amount or the shutter speed corresponding to the streaming amount are displayed at the image information display field 1209.

As described above, in the present exemplary embodiment, the CPU 103 aligns and combines images in which a subject is not blurred due to shaking, and applies blur processing to the background. Accordingly, the CPU 103 can generate a panning-like composite image having an effect similar to that of a shot image that is captured at such a shutter speed as to make it difficult to perform general panning shooting. Furthermore, since, when combining a plurality of images, the CPU 103 applies blur processing to the background according to the amount of movement of the background with respect to the main subject, the CPU 103 can generate a more effective panning-like composite image. Moreover, since the CPU 103 allows shooting at the streaming amount by which the user desires to stream the background regardless of the speed of a main subject, the CPU 103 can generate an appropriate panning-like composite image without the user considering the appropriate shutter speed, which is the most significant setting item for panning shooting.

As described above, according to the above-described exemplary embodiments, a panning-like composite image in which the boundary between a main subject and a background may appear smooth can be generated.

The configuration of an image capturing apparatus according to a third exemplary embodiment is similar to that of the first exemplary embodiment illustrated in FIG. 1, and the description thereof is, therefore, not repeated. In addition, the processing by the CPU 103 about the shooting and recording operations in the panning shooting mode according to the third exemplary embodiment is similar to that in the first exemplary embodiment illustrated in FIG. 2, and the description thereof is, therefore, not repeated.

Figure 13A:
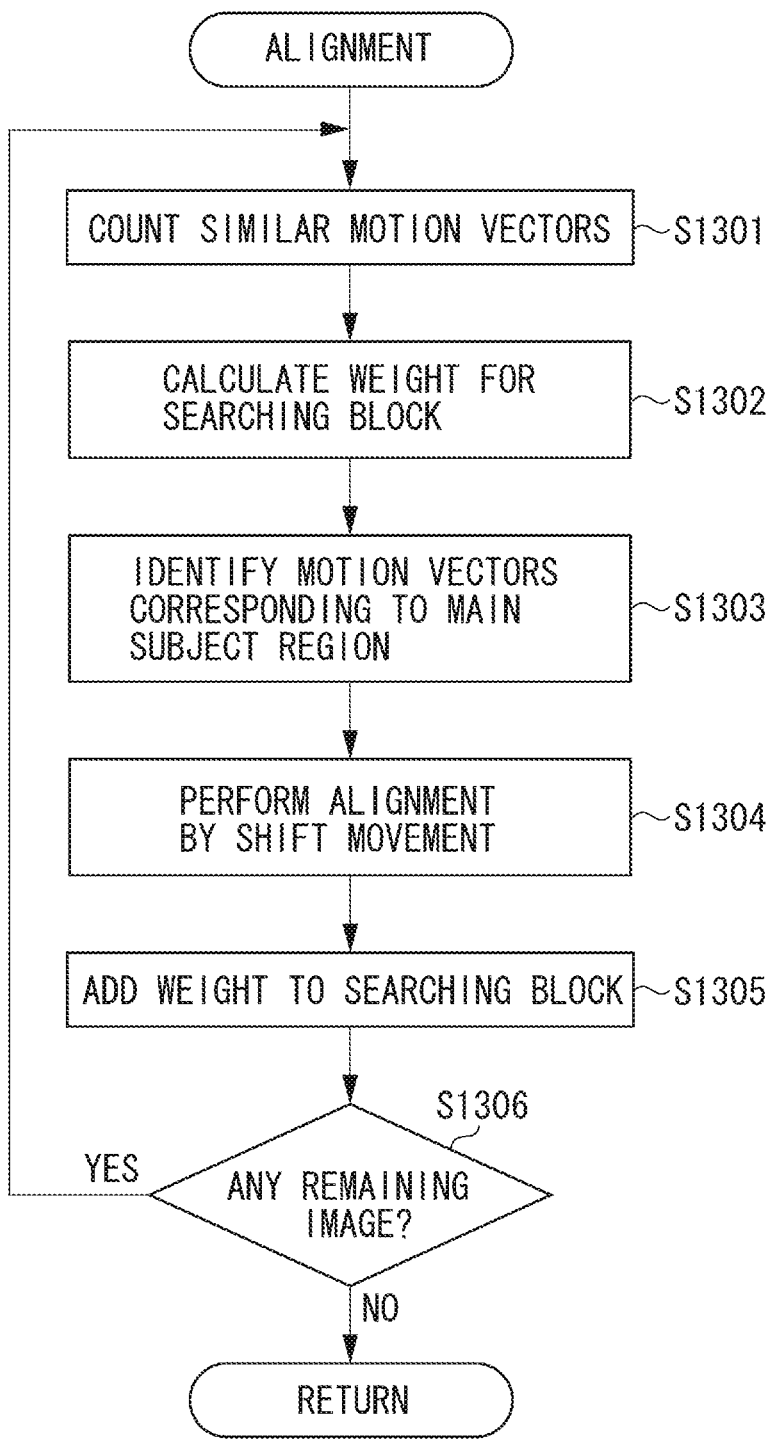
FIGS. 13A and 13B are respectively a flowchart illustrating alignment processing and a graph illustrating a histogram of motion vectors according to a third exemplary embodiment of the present invention.

FIG. 13A is a flowchart illustrating the details of processing for detecting a main subject region (a moving object region) and processing for alignment between images in the main subject region.

Figure 13B:
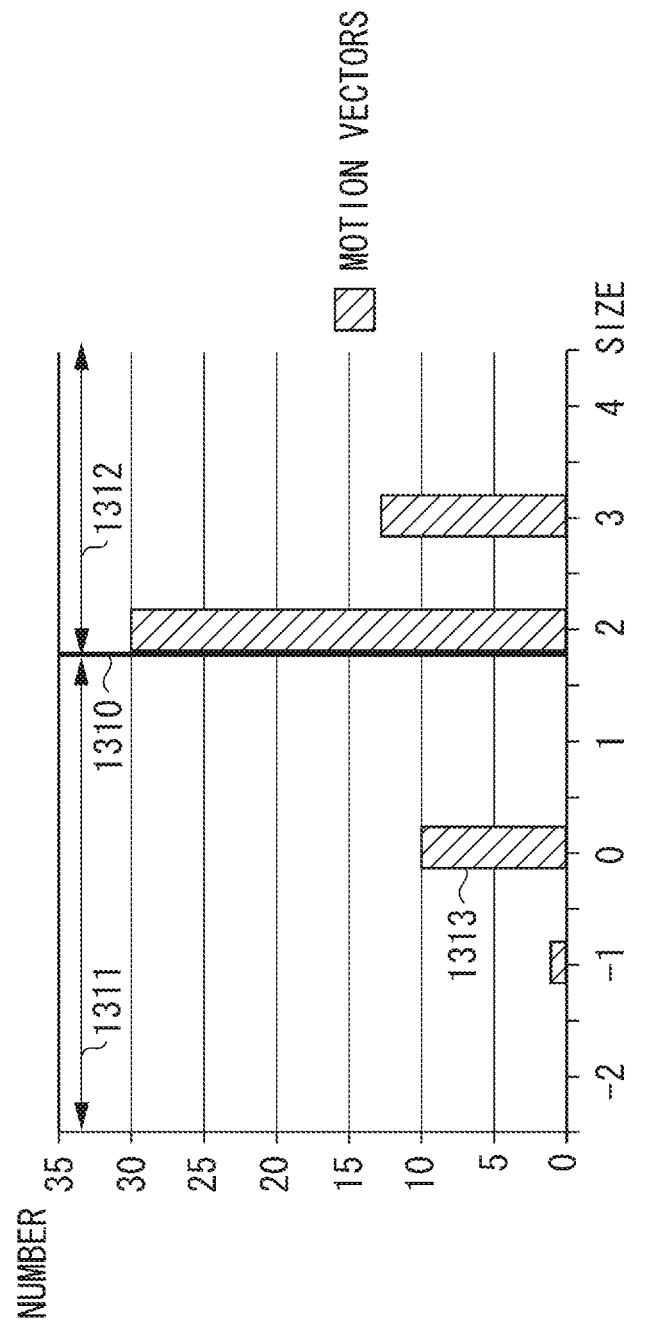

In step S1301, the CPU 103 sets searching blocks obtained by dividing an image into a plurality of regions, and detects motion vectors between images for each searching block. Then, the CPU 103 calculates the number of approximately similar vectors among the detected motion vectors. FIG. 13B illustrates a result of the counting in a histogram with the horizontal axis indicating the size of a vector and the vertical axis indicating the number (frequency) of vectors. The horizontal axis distinguishes the directions of motion vectors with the boundary set to "0". First, the CPU 103 sets, as a reference, the amount of movement 1310 of the background based on the shaking detected by the angular velocity sensor 105 (i.e., motion information of an image capturing unit between a plurality of images), and, as illustrated in FIG. 13B, classifies motion vectors into a main subject component 1311, which is distant from the amount of movement of the background, and a background component 1312, which is near the amount of movement of the background. Next, the CPU 103 sets, as main subject vectors 1313, motion vectors the number of which is the largest among the motion vectors in the main subject component 1311. In addition, the CPU 103 can distinguish between a main subject and a background based on a histogram of motion vectors without using information about the shaking detected by the angular velocity sensor 105. For example, in a case where panning shooting is performed by a user's panning operation, since a main subject is supposed to be located approximately near the center of each image, a region corresponding to motion vectors the size of which is almost zero and which gather in a contiguous region within each image is considered as a main subject region. However, since erroneous detection of motion vectors may occur depending on the size of a searching region of motion vectors, the method using shaking information obtained by the sensor, as in the present exemplary embodiment, can more accurately distinguish between a main subject and a background.

In step S1302, the CPU 103 calculates a weight corresponding to the number of times for which a searching block in which motion vectors corresponding to the main subject region have been detected has included motion vectors used for previous alignment between images.

In step S1303, the CPU 103 identifies motion vectors corresponding to the main subject region. In the present exemplary embodiment, the CPU 103 estimates the amount of movement of the background between target images based on a signal from the angular velocity sensor 105, and estimates, as motion vectors corresponding to the main subject, motion vectors the number of which is the largest when the motion vectors corresponding to the background are excluded. However, the number to be counted and compared between motion vectors is taken in consideration of a weight calculated for each region in step S1302. In addition, while, in the present exemplary embodiment, the angular velocity of the image capturing apparatus 100 is detected by the angular velocity sensor 105, this is not a restricted one. For example, an acceleration sensor, a position measuring sensor, or the like may be used.

Furthermore, in step S1301, the CPU 103 may count the number of motion vectors while, at the same time, considering the weight for each searching block, which would be calculated in step S1302, for example, while additionally counting the number corresponding to the weight.

In step S1304, the CPU 103 performs alignment of images by shift movement within memory of the primary storage device 104 based on motion vectors of the main subject. In the present exemplary embodiment, it is presumed that shooting is performed with a panning operation, the CPU 103 distinguishes motion vectors of the background in the above-described way as a method for determining motion vectors of the main subject. In a case where the method for distinguishing motion vectors of the background based on a signal from the angular velocity sensor 105 is not employed, the CPU 103 considers motion vectors the number of which is the second largest as motion vectors of the main subject. Alternatively, the CPU 103 detects whether a region having such motion vectors exists in a certain degree of cluster to estimate motion vectors of the main subject. Moreover, in a case where it is presumed that shooting is performed with the image capturing apparatus 100 fixed to a tripod, the CPU 103 can simply determine that motion vectors the number of which is the largest on an image are motion vectors of the main subject. In addition, the CPU 103 may treat motion vectors in the image horizontal direction and those in the image vertical direction separately or may treat the motion vectors collectively.

In step S1305, the CPU 103 adds the weight to a searching block in which motion vectors estimated as those corresponding to the main subject have been detected, to make preparations for next searching.

Finally, in step S1306, the CPU 103 determines the presence or absence of a remaining image for alignment. If the CPU 103 determines the presence of a remaining image for alignment (YES in step S1306), the processing returns to step S1301 to perform alignment for the next image. If the alignment of all the images is completed (NO in step S1306), the processing in step S212 illustrated in FIG. 2 ends.

The details of the method for estimating motion vectors of the main subject region in alignment processing illustrated in FIG. 13A are described with reference to FIGS. 14A and 14B.

Figure 14A:
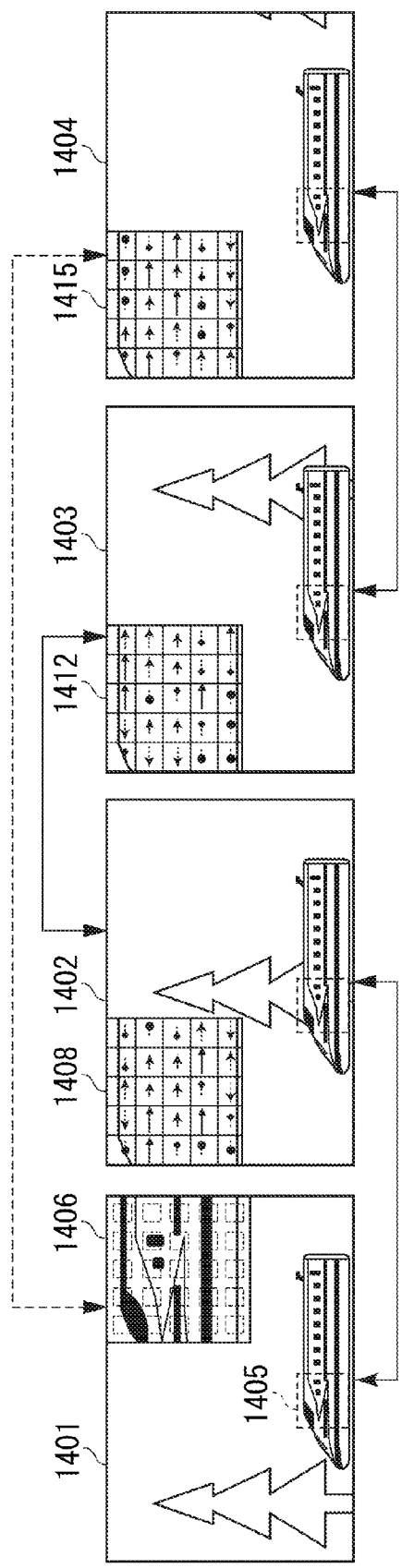
FIGS. 14A and 14B are explanatory diagrams illustrating alignment processing according to the third exemplary embodiment.

Referring to FIG. 14A, in serially shot images 1401 to 1404, a region 1405 is targeted for alignment as an example. In the image 1401, a region 1406 obtained by enlarging the region 1405 and arranging searching blocks is illustrated. motion vectors such as the motion vectors 313 illustrated in FIG. 3B are detected for the respective searching blocks.

Figure 14B:
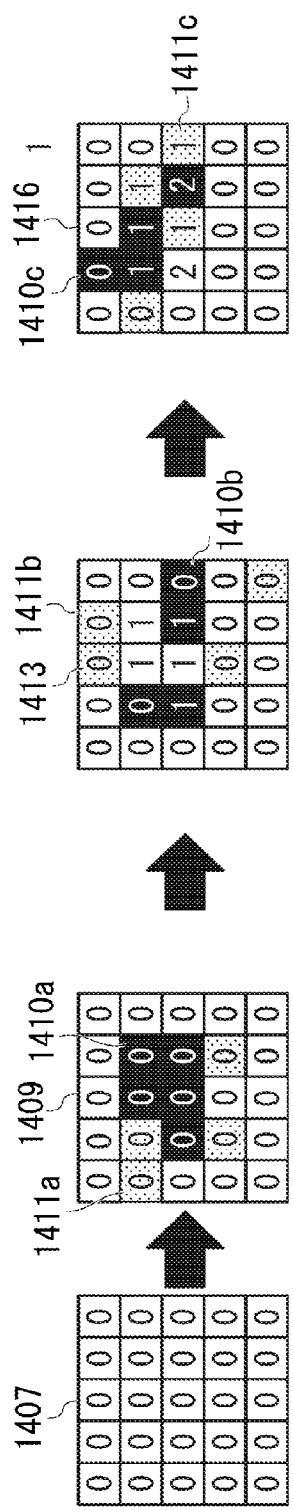

FIG. 14B illustrates the weights corresponding to the respective searching blocks set as in the region 1406. The weights are temporarily stored in a RAM in association with the positions of the respective searching blocks. The weights have initial values 1407, which are zero in the present exemplary embodiment. A result of detection 1408 of motion vectors between the image 1401 and the image 1402 is illustrated in the image 1402. A result of detection 1412 of motion vectors between the image 1402 and the image 1403 is illustrated in the image 1403. A result of detection 1415 of motion vectors between the image 1403 and the image 1404 is illustrated in the image 1404. Weight distributions 1409, 1413, and 1416 are used to calculate motion vectors of the main subject from the motion vectors included in the results of detection 1408, 1412, and 1415, respectively. A pattern 1410a in the corresponding weight distribution 1409 indicates regions in which approximately similar motion vectors the number of which is the largest in the result of detection 1408 are detected. A pattern 1411a indicates regions in which approximately similar motion vectors the number of which is the second largest in the result of detection 1408 are detected. Also, a pattern 1410b and a pattern 1411b in the weight distribution 1413 corresponding to the result of detection 1412 respectively indicate regions in which approximately similar motion vectors the number of which is the largest and approximately similar motion vectors the number of which is the second largest in the result of detection 1412 are detected. Furthermore, a pattern 1410c and a pattern 1411c in the weight distribution 1416 corresponding to the result of detection 1415 respectively indicate regions in which approximately similar motion vectors the number of which is the largest and approximately similar motion vectors the number of which is the second largest in the result of detection 1415 are detected.

In the result of detection 1408, since the weights for the respective searching blocks in the weight distribution 1409 have initial values of zero, motion vectors the number of which is the largest can be identified as motion vectors of the main subject. Accordingly, in the weight distribution 1409, when the number of motion vectors in the pattern 1410a is compared with that in the pattern 1411a, the number in the pattern 1410a, which is five, is larger than the number in the pattern 1411a, which is four. Therefore, motion vectors in the pattern 1410a are used as the motion vectors of the main subject to perform subsequent alignment processing.

Next, in the result of detection 1412, the weight distribution 1413 has some weights to which "1" is added for the searching blocks having motion vectors used for alignment between the image 1401 and the image 1402. In this example, in the pattern 1410b, the number of motion vectors is four and the weights for the searching blocks are two, so that the total is six. Therefore, motion vectors in the pattern 1410b are used for alignment. Incidentally, in a case where two or more types of motion vectors become leading candidates when compared in consideration of the weights, either one of the number of motion vectors and the weight for searching blocks is previously prioritized to determine motion vectors used for alignment. Alternatively, the order of detection of motion vectors may be used.

Finally, in the result of detection 1415, the weight distribution 1416 has some weights to which "1" is further added, with the accumulated weight, for the searching blocks having motion vectors used for alignment between the image 1403 and the image 1404. In the pattern 1410c, the number of motion vectors is four and the weights for the searching blocks are four, so that the total is eight. Also, in the pattern 1411c, the number of motion vectors is four and the weights for the searching blocks are three, so that the total is seven. Therefore, motion vectors in the pattern 1410c are used as motion vectors corresponding to the main subject region to perform alignment.

As described above, in the present exemplary embodiment, alignment is performed by preferentially considering evaluation values from the same region as the subject region previously used for alignment. Accordingly, a deviation in image can be reduced between images having such a relation as the images 1401 and 1404, between which motion vectors are not directly detected as between the images 1401 and 1402, between the images 1402 and 1403, and between the images 1403 and 1404. Furthermore, motion vectors in the same region are not merely used, but are preferentially used with the attached weight. Thus, even when motion vectors are erroneously detected, it is possible to reduce the adverse effect of erroneous detection by using motion vectors in another region and the accumulated weight.

In addition, while, in FIG. 14B, the weight for a block is set as "1", this is not a restrictive one. A coefficient for the weight can be freely adjusted. For example, the coefficient may be set to a value between "0" and "1", and the coefficient may be multiplied by the number of times for which the block has been used for alignment to obtain the weight.

As described above, in the present exemplary embodiment, when performing alignment on three or images, the CPU 103 adds a weight to a region corresponding to motion vectors of a main subject detected between images and uses the motion vectors to detect motion vectors of the main subject between subsequent images. Accordingly, the CPU 103 can perform alignment while reducing the adverse effect of erroneous detection of motion vectors. Also, using this alignment method, the CPU 103 can generate an appropriate panning-like composite image.

In the above-described third exemplary embodiment, when a plurality of images is sequentially aligned with respect to a main subject, a weight is successively added to a region corresponding to motion vectors of the main subject detected between images, thus enhancing the accuracy of alignment. In a fourth exemplary embodiment, alignment is performed in a region which the user particularly intends to prevent from blurring among the main subject region, by further using auxiliary information, such as a signal from the angular velocity sensor 105, a result of face detection by image analysis, or a result of subject detection such as human body detection. The configuration of an image capturing apparatus according to the fourth exemplary embodiment is similar to that of the first exemplary embodiment illustrated in FIG. 1, and the description thereof is, therefore, not repeated.

Figure 15:
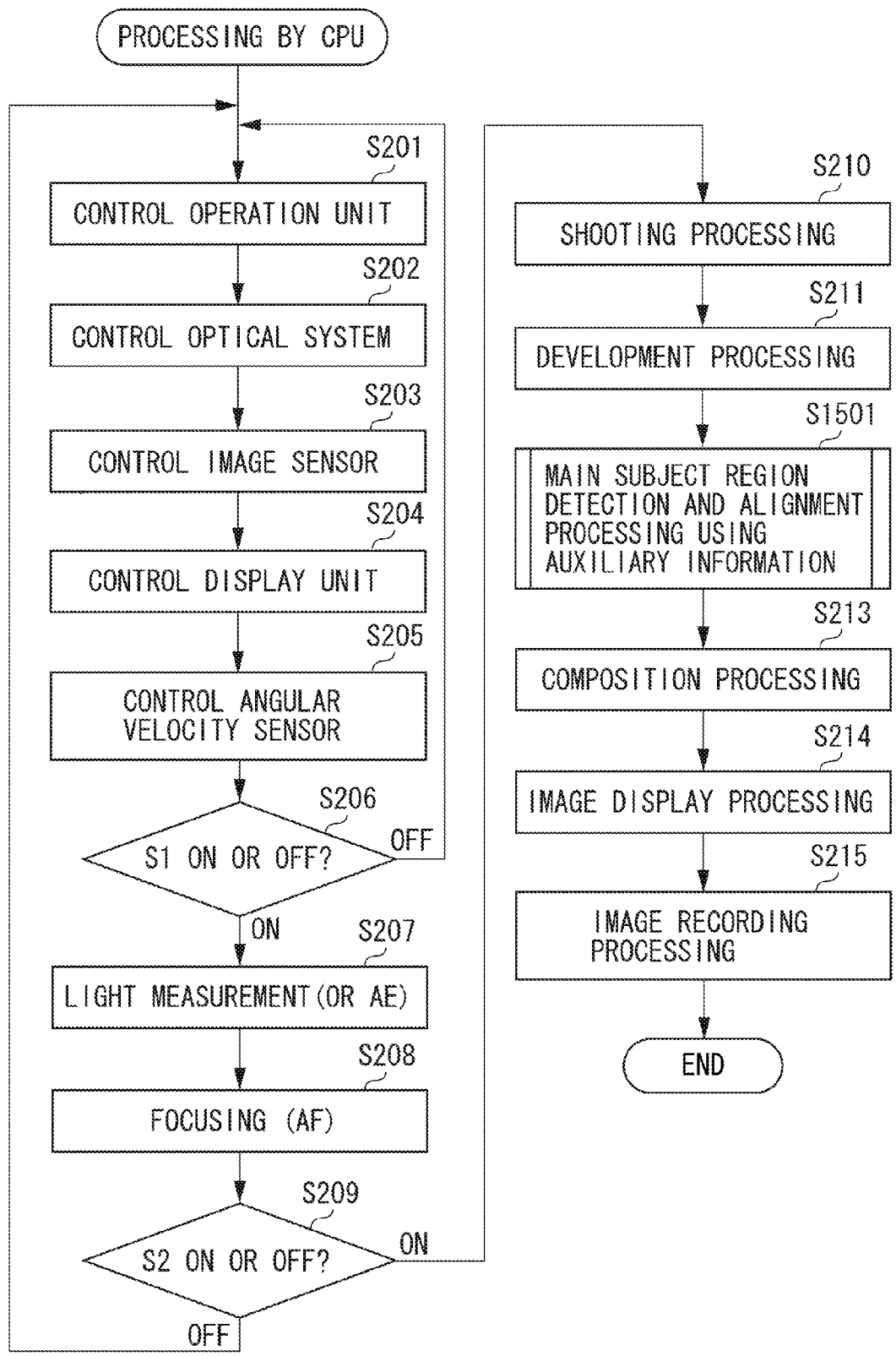
FIG. 15 is a flowchart illustrating processing performed by a CPU according to a fourth exemplary embodiment of the present invention.

FIG. 15 is a flowchart illustrating processing by the CPU 103 for shooting and recording in the panning shooting mode.

Steps similar to those in FIG. 2 are assigned with the same step numbers, and the description thereof is omitted. In step S1501, the CPU 103 determines a main subject region and a specific region that is considered particularly important even among the main subject region, by using an angular velocity detected from a signal from the angular velocity sensor 105 or a result of subject detection, and performs alignment with reference to the specific region.

Figure 16:
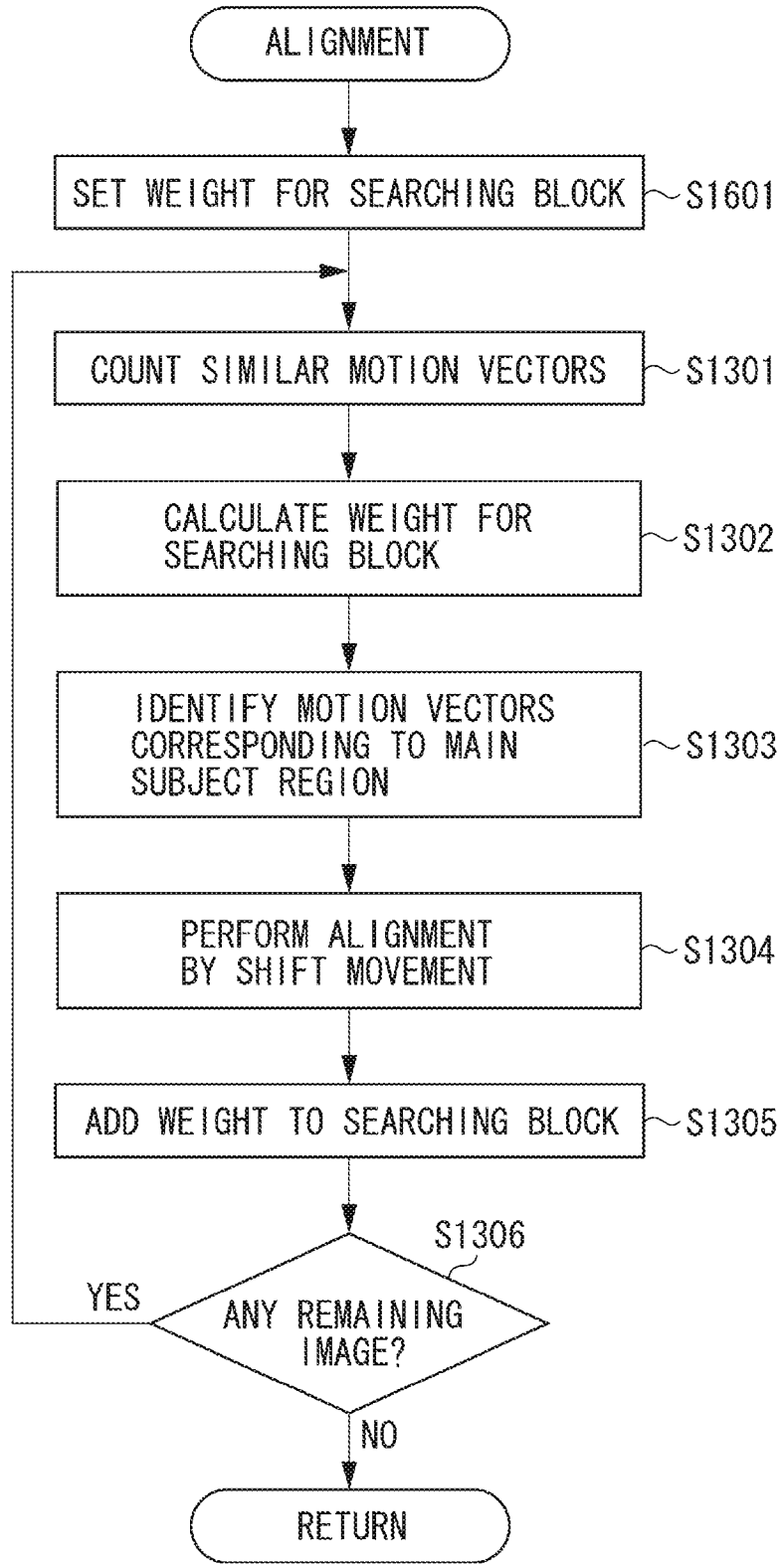
FIG. 16 is a flowchart illustrating alignment processing according to the fourth exemplary embodiment.

FIG. 16 is a flowchart illustrating the details of processing for main subject detection and alignment using the auxiliary information, which is performed in step S1501 illustrated in FIG. 15.

Figure 17:
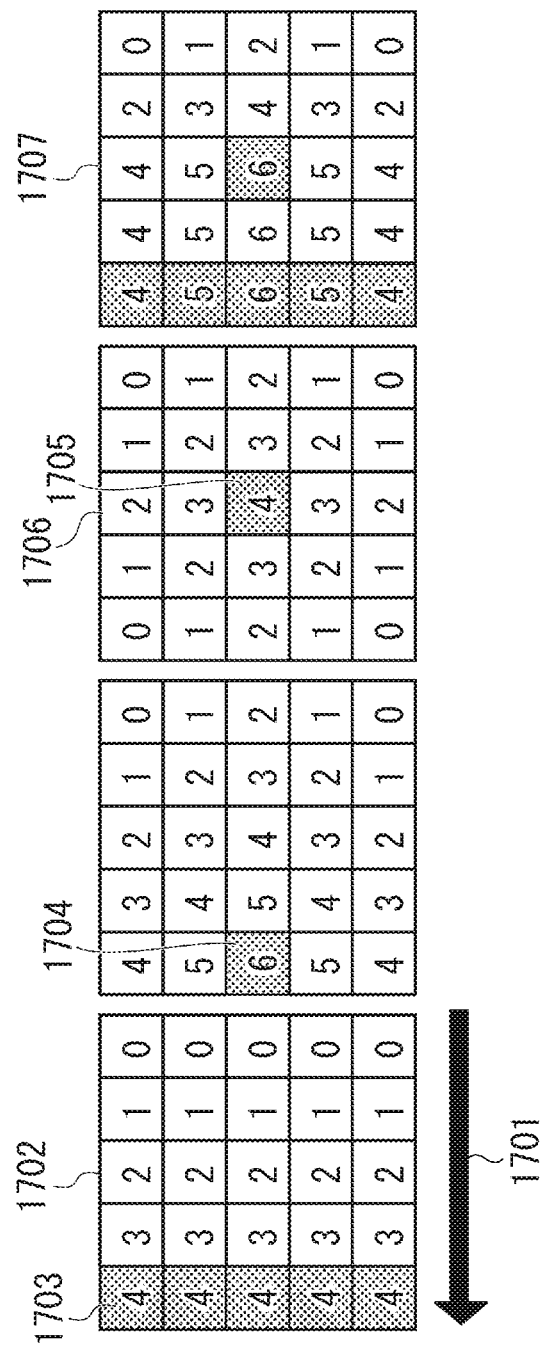
FIG. 17 is an explanatory diagram illustrating alignment processing according to the fourth exemplary embodiment.
Figure 18C:
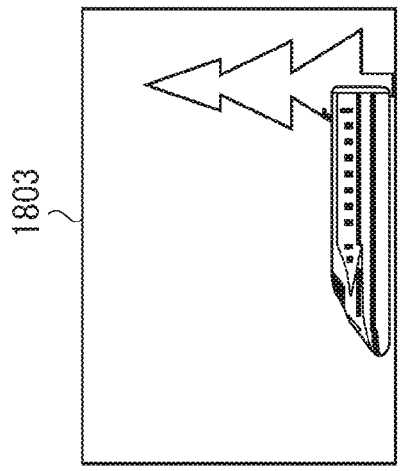
FIGS. 18A, 18B, 18C, and 18D illustrate processing for generating a panning composite image according to an exemplary embodiment of the present invention.
Figure 18B:
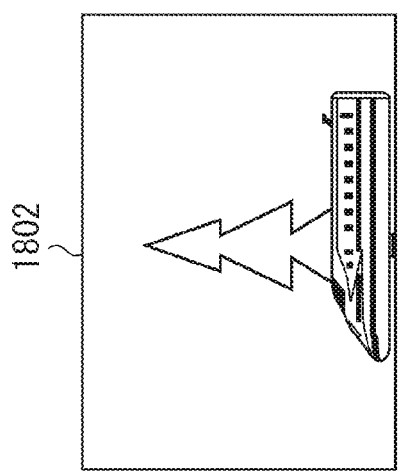
Figure 18D:
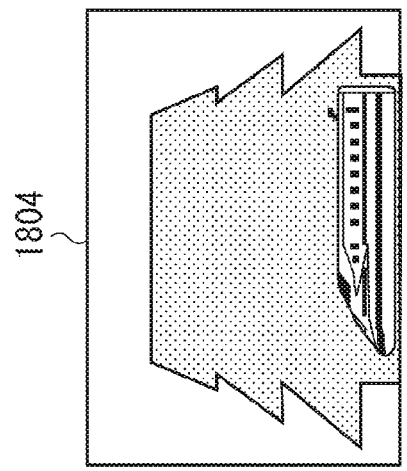
Figure 18A:
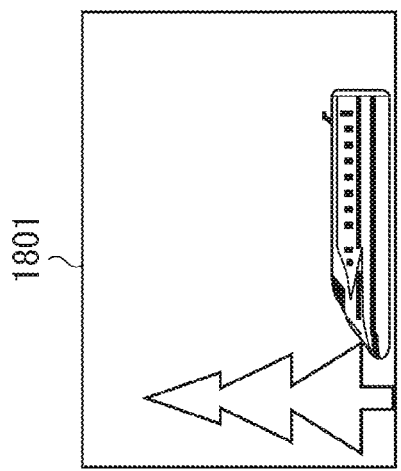

In the present exemplary embodiment, in step S1601, the CPU 103 sets weights for searching blocks based on a region that is considered important in a subject and that is determined from an angular velocity of the image capturing apparatus 100 detected by the angular velocity sensor 105 or a result of the above-described subject detection. The details of processing for setting weights are described with reference to FIG. 17.

Here, suppose that the CPU 103 can discriminate the panning direction based on the angular velocity of the image capturing apparatus 100 and can discriminate a relative moving direction 1701 of the main subject based on motion vectors in the respective regions. At this time, the CPU 103 sets weights in a weight distribution 1702 in such a manner that a fore end of the main subject is prioritized as indicated in a painted portion 1703. In addition, the CPU 103 may set weights such that a part of the fore end of the main subject, for example, a leading edge portion of the main subject, is prioritized as indicated in a painted portion 1704.

In a case where a face is detected by a subject detection unit, such as a face detection circuit, incorporated in the image processing unit 106, the CPU 103 sets weights for searching blocks as in a weight distribution 1706 centering on a region 1705, which would be considered important within the detected subject (region), for example, a region of the eyes within the face region. Furthermore, for example, the CPU 103 may set weights for searching blocks as in a weight distribution 1707 by combining the concepts of the weight distributions 1702 and 1706. As another method for determining an important specific region, the CPU 103 may determine, as the specific region, a main subject region corresponding to an in-focus position based on information about an in-focus region obtained in an autofocus (AF) operation.

As described above, in the present exemplary embodiment, alignment is performed by preferentially considering evaluation values from the same region as the subject region previously used for alignment. Accordingly, a deviation in image can be reduced between images having such a relation as the images 1401 and 1404, between which motion vectors are not directly detected. Particularly, in the present exemplary embodiment, the CPU 103 determines a specific region, which the user desires to especially set as a reference, based on subject detection information or motion information of the image capturing apparatus 100. Furthermore, motion vectors in the same region are not merely used, but are preferentially used with the attached weight. Thus, even when motion vectors are erroneously detected, it is possible to reduce the adverse effect of erroneous detection by using motion vectors in another region and the accumulated weight.

Moreover, in the present exemplary embodiment, adding weights to searching blocks enables alignment concentrating heavily on a reduction of blurring of a certain part of the main subject. Furthermore, since it is possible to reduce blurring in a characteristic portion of the main subject by using a shooting condition, such as an angular velocity of the image capturing apparatus 100, or subject recognition, such as face detection or human body detection, an image with less conspicuous blurring of the main subject can be generated.

FIGS. 18A to 18D illustrate a process for generating a composite image in each of the above-described exemplary embodiments. An image 1804 is a composite image generated by performing image composition in step S213 based on images 1801, 1802, and 1803. The composite image 1804 clearly shows a vehicle, which is a moving object and is a main subject, and a tree as the streaming background. This method can change and control the streaming manner of the background by using a shooting interval (frame rate), the number of images to be combined, or the number of taps for blur processing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-136922 filed Jun. 28, 2013 and No. 2013-136923 filed Jun. 28, 2013, which are hereby incorporated by reference herein in their entirety.

What is claimed is:

1. An image processing apparatus comprising:
a memory;
a processor coupled to the memory which executes the following:
identifying a main subject region and a background region different from the main subject region with respect to a plurality of images captured by an image capturing unit;
aligning the main subject regions of the plurality of images and to generate a composite image in which predetermined blur processing is applied to the background region;
detecting an amount of movement of the background region between the plurality of images;
controlling an amount of blurring in the blur processing based on the amount of movement of the background region between the plurality of images detected; and
generating a first composite image into which the plurality of images aligned with reference to the main subject region are combined and a second composite image to which blur processing to blur the background region of the first composite image is applied, and combines the first composite image and the second composite image based on the main subject region.

2. The image processing apparatus according to claim 1, further comprising setting an amount of streaming of the background region in the composite image,
controlling the number of images to be combined based on the amount of streaming.

3. The image processing apparatus according to claim 2, wherein the amount of streaming includes information corresponding to an equivalent shutter speed in the composite image, and
controlling the number of images to be combined such that a total of shutter speeds of the images to be combined becomes equal to the shutter speed.

4. The image processing apparatus according to claim 2, wherein the amount of streaming includes information corresponding to a breadth of streaming of the background region in the composite image,
controlling the number of images to be combined based on the amount of movement of the background region and the amount of streaming.

5. The image processing apparatus according to claim 1, further comprising setting an amount of streaming of the background region in the composite image,
combining images to which blur processing is applied at respective amounts of blurring based on the amount of movement of the background region between images in the plurality of images, and
controlling the amount of blurring to be applied to the background region in the plurality of images based on the amount of movement of the background region detected and the amount of streaming.

6. The image processing apparatus according to claim 1, further comprising performing the blur processing at such an amount of blurring as to interpolate for an interval between the corresponding background regions in combining the plurality of images based on the amount of movement of the background region.

7. The image processing apparatus according to claim 1, further comprising performing the blur processing via a low-pass filter having a number of taps corresponding to the amount of blurring.

8. The image processing apparatus according to claim 7, further comprising applying the low-pass filter while varying a coefficient within each tap for each region of the composite image.

9. The image processing apparatus according to claim 1, further comprising detecting the amount of movement of the background region between the plurality of images based on an image of the background region or information about shaking of the image capturing unit with respect to the plurality of images.

10. The image processing apparatus according to claim 1, further comprising generating a third composite image by mainly using the first composite image for a region corresponding to the main subject region and mainly using the second composite image for a region corresponding to the background region.

11. The image processing apparatus according to claim 1, further comprising generating the composite image by applying blur processing to the plurality of images at respective amounts of blurring set for the plurality of images and then combining the plurality of images.

12. The image processing apparatus according to claim 1, further comprising detecting motion vectors between the plurality of images and detects the amount of movement of the background region based on the motion vectors.

13. The image processing apparatus according to claim 1, further comprising detecting the amount of movement of the background region based on information about shaking of the image capturing unit.

14. The image processing apparatus according to claim 1, further comprising calculating motion vectors between the plurality of images and identifies the main subject region based on the motion vectors.

15. The image processing apparatus according to claim 1, further comprising identifying the main subject region based on information about shaking of the image capturing unit.

16. The image processing apparatus according to claim 1, further comprising:
displaying the plurality of images on a display medium; and
detecting a touch operation on an image displayed on the display medium,
setting an amount of streaming of the background region in the composite image based on the touch operation detected.

17. An image processing apparatus method:
identifying a main subject region and a background region different from the main subject region with respect to a plurality of images captured by an image capturing unit;

aligning the main subject regions of the plurality of images and generating a composite image in which predetermined blur processing is applied to the background region;

detecting an amount of movement of the background region between the plurality of images based on an image of the background region or information about shaking of the image capturing unit with respect to the plurality of images; and controlling an amount of blurring in the blur processing based on the detected amount of movement of the background region between the plurality of images, wherein the composition unit generates a first composite image into which the plurality of images aligned with reference to the main subject region are combined and a second composite image to which blur processing to blur the background region of the first composite image is applied, and combines the first composite image and the second composite image based on the main subject region.

18. A non-transitory computer-readable storage medium storing a program that causes a computer to execute the image processing method according to claim 17.

* * * * *